United States Patent
Lee et al.

(10) Patent No.: US 10,779,143 B2
(45) Date of Patent: Sep. 15, 2020

(54) APPARATUS AND METHOD FOR CONTROLLING OTHER ELECTRONIC DEVICE IN ELECTRONIC DEVICE

(71) Applicant: Samsung Electronics Co., Ltd., Gyeonggi-do (KR)

(72) Inventors: Tae-Young Lee, Seoul (KR); Jae-Eun Kang, Gyeonggi-do (KR); Han-Su Kang, Seoul (KR); Sung-Il Park, Gyeonggi-do (KR); Seong-Hee Park, Seoul (KR); Bong-Jhin Shin, Gyeonggi-do (KR); Chil-Youl Yang, Gyeonggi-do (KR); Myoung-Hwan Lee, Gyeonggi-do (KR); Jang-Hee Lee, Gyeonggi-do (KR); Chun-Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 177 days.

(21) Appl. No.: 15/307,612

(22) PCT Filed: Apr. 28, 2015

(86) PCT No.: PCT/KR2015/004222
§ 371 (c)(1),
(2) Date: Oct. 28, 2016

(87) PCT Pub. No.: WO2015/167204
PCT Pub. Date: Nov. 5, 2015

(65) Prior Publication Data
US 2017/0048648 A1    Feb. 16, 2017

(30) Foreign Application Priority Data

Apr. 29, 2014    (KR) .................. 10-2014-0051743

(51) Int. Cl.
*H04W 84/00*    (2009.01)
*H04W 4/70*    (2018.01)
(Continued)

(52) U.S. Cl.
CPC ............. *H04W 4/70* (2018.02); *G06F 3/14* (2013.01); *H04B 17/27* (2015.01); *H04L 12/12* (2013.01);
(Continued)

(58) Field of Classification Search
CPC ..... H04W 4/005; H04W 88/02; H04W 28/06; H04L 12/12; H04L 1/0026; H04L 1/0029
See application file for complete search history.

(56) References Cited

U.S. PATENT DOCUMENTS 7,032,022 B1 *  4/2006  Shanumgam ....... H04L 41/0893
                                            707/999.009
10,169,534 B2    1/2019  Day et al.
(Continued)

FOREIGN PATENT DOCUMENTS

CN    2512165    9/2002
CN    101127155    2/2008
(Continued)

OTHER PUBLICATIONS

PCT/ISA/237 Written Opinion issued on PCT/KR2015/004222 (pp. 8).
(Continued)

*Primary Examiner* — Anez C Ebrahim
(74) *Attorney, Agent, or Firm* — The Farrell Law Firm, P.C.

(57) ABSTRACT

According to an embodiment of the present disclosure, a method for operating an electronic device includes displaying a result of recognizing at least one other electronic device as at least one item, and sending a message request-
(Continued)

ing the at least one other electronic device to output an identifiable signal.

18 Claims, 27 Drawing Sheets

(51) Int. Cl.
| | |
|---|---|
| *H04W 4/029* | (2018.01) |
| *H04L 12/12* | (2006.01) |
| *H04L 12/28* | (2006.01) |
| *H04L 29/08* | (2006.01) |
| *H04W 4/08* | (2009.01) |
| *H04W 4/02* | (2018.01) |
| *H04W 52/02* | (2009.01) |
| *H04B 17/27* | (2015.01) |
| *G06F 3/14* | (2006.01) |
| *H04W 4/80* | (2018.01) |
| *H04B 17/318* | (2015.01) |

(52) U.S. Cl.
CPC ........ *H04L 12/282* (2013.01); *H04L 12/2809* (2013.01); *H04L 67/125* (2013.01); *H04L 67/16* (2013.01); *H04L 67/18* (2013.01); *H04L 67/36* (2013.01); *H04W 4/023* (2013.01); *H04W 4/029* (2018.02); *H04W 4/08* (2013.01); *H04W 52/0245* (2013.01); *H04B 17/318* (2015.01); *H04W 4/80* (2018.02); *Y02D 70/1262* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/21* (2018.01); *Y02D 70/26* (2018.01)

(56) References Cited

U.S. PATENT DOCUMENTS

| | | | | |
|---|---|---|---|---|
| 2003/0048357 | A1* | 3/2003 | Kain | B64D 47/08 |
| | | | | 348/144 |
| 2005/0198306 | A1* | 9/2005 | Palojarvi | H04L 63/0272 |
| | | | | 709/227 |
| 2006/0066573 | A1 | 3/2006 | Matsumoto | |
| 2008/0101273 | A1 | 5/2008 | Everest | |
| 2009/0210932 | A1 | 8/2009 | Balakrishnan et al. | |
| 2010/0083335 | A1* | 4/2010 | Talbert | H04N 21/44209 |
| | | | | 725/131 |
| 2011/0140864 | A1 | 6/2011 | Bucci | |
| 2011/0317694 | A1* | 12/2011 | Pleshek | H04L 43/028 |
| | | | | 370/389 |
| 2012/0039316 | A1* | 2/2012 | Park | G01S 5/0284 |
| | | | | 370/338 |
| 2012/0317194 | A1 | 12/2012 | Tian | |
| 2013/0115892 | A1 | 5/2013 | Kurz | |
| 2013/0182193 | A1 | 7/2013 | Shintani et al. | |
| 2013/0225197 | A1 | 8/2013 | McGregor et al. | |
| 2013/0260348 | A1 | 10/2013 | Blow et al. | |
| 2013/0324081 | A1 | 12/2013 | Gargi et al. | |
| 2014/0031017 | A1 | 1/2014 | Howard et al. | |
| 2014/0057670 | A1 | 2/2014 | Lim et al. | |
| 2014/0068751 | A1 | 3/2014 | Last | |

FOREIGN PATENT DOCUMENTS

| | | |
|---|---|---|
| CN | 201504341 | 6/2010 |
| CN | 102033830 | 4/2011 |
| CN | 104510488 | 4/2015 |
| EP | 2 293 531 | 3/2011 |

OTHER PUBLICATIONS

PCT/ISA/210 Search Report issued on PCT/KR2014/004222 (pp. 4).
European Search Report dated Nov. 7, 2017 issued in counterpart application No. 15785469.6-1853, 12 pages.
Chinese Office Action dated Feb. 2, 2019 issued in counterpart application No. 201580023482.5, 42 pages.
European Search Report dated Jan. 28, 2019 issued in counterpart application No. 15785469.6-1213, 7 pages.
Hewlett-Packard Company, "Visual or Audible Verification of Printer Choice", Research Disclosure, XP007140913, vol. 571, No. 23, Nov. 1, 2011, 2 pages.
Chinese Office Action dated Dec. 4, 2019 issued in counterpart application No. 201580023482.5, 47 pages.
European Search Report dated Nov. 14, 2019 issued in counterpart application No. 15785469.6-1213, 7 pages.
Anonymous: "How do I Connect to my Bluetooth Headset?—Ask Ubuntu", XP055708163, Feb. 21, 2013, 10 pages.
Anonymous: "Revisions to How do I Connect to my Bluetooth Headset?—Ask Ubuntu", XP055708166, Jun. 12, 2020, 11 pages.
European Search Report dated Jun. 29, 2020 issued in counterpart application No. 15785469.6-1213, 7 pages.
KR Office Action dated May 29, 2020 issued in counterpart application No. 10-2014-0051743, 10 pages.

* cited by examiner

[Fig. 1]
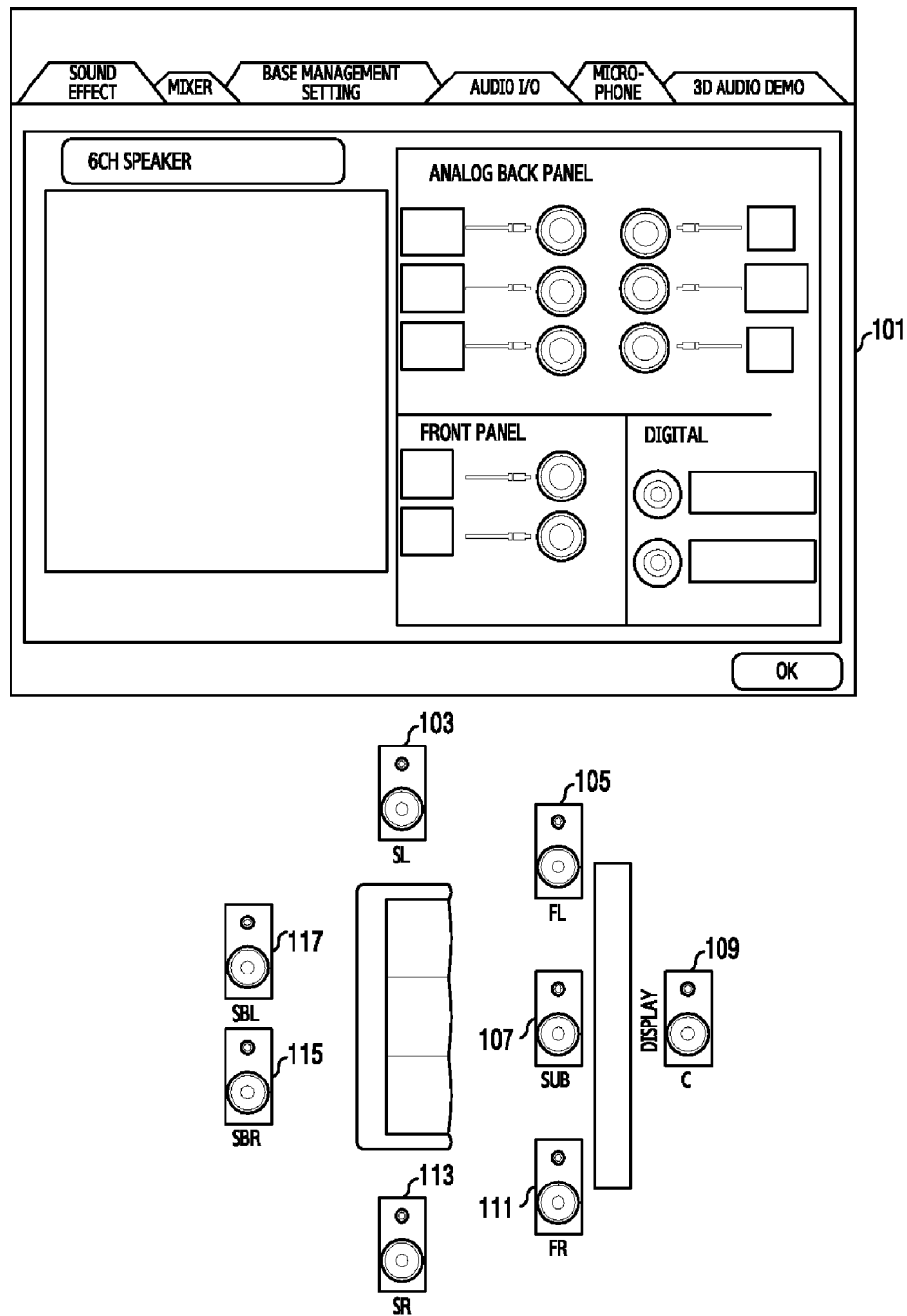

[Fig. 2]
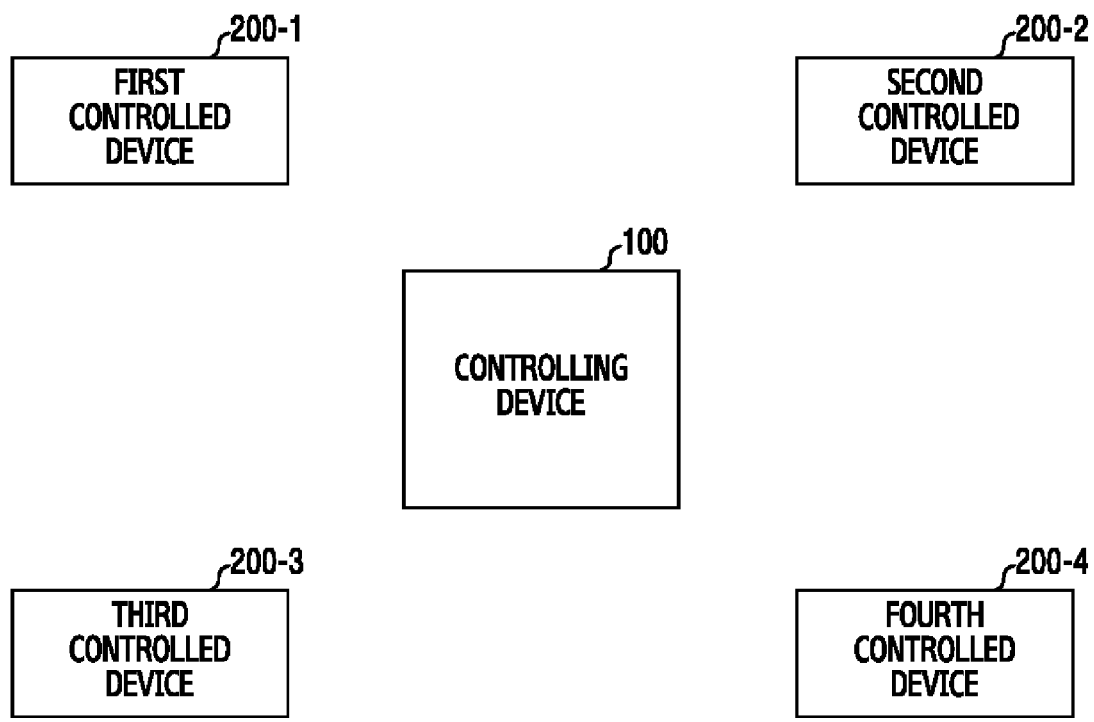

[Fig. 3a]
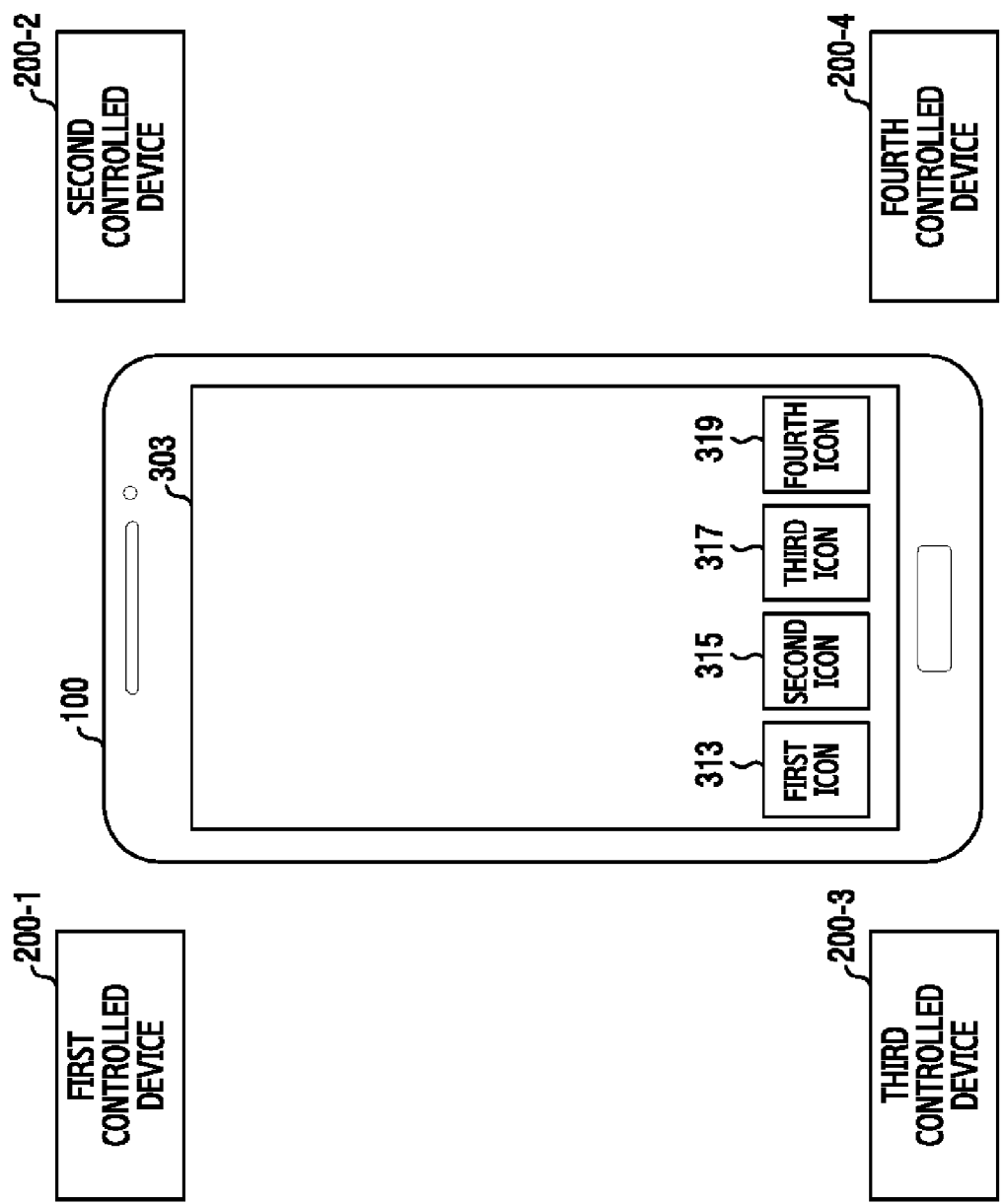

[Fig. 3b]
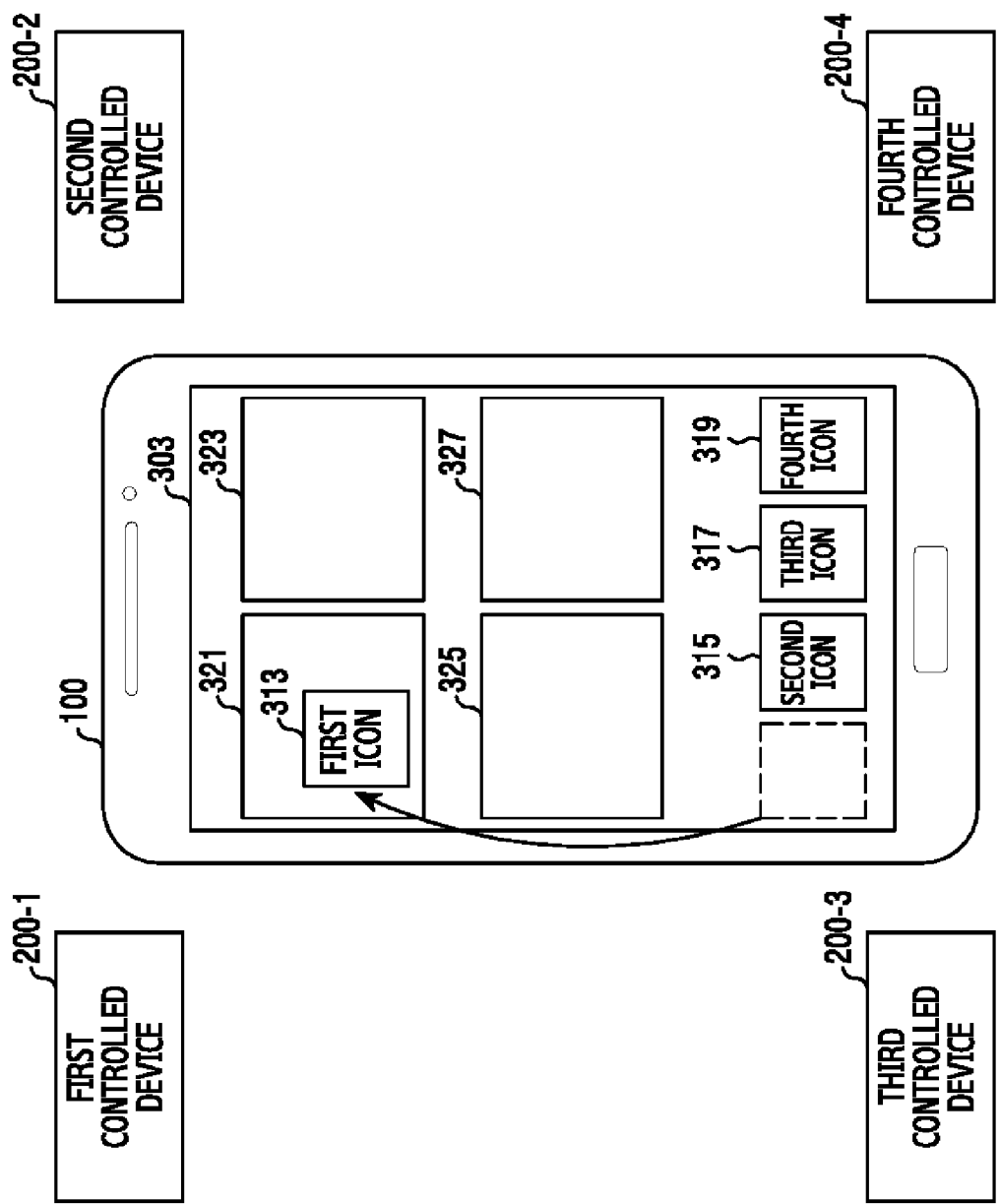

[Fig. 4a]
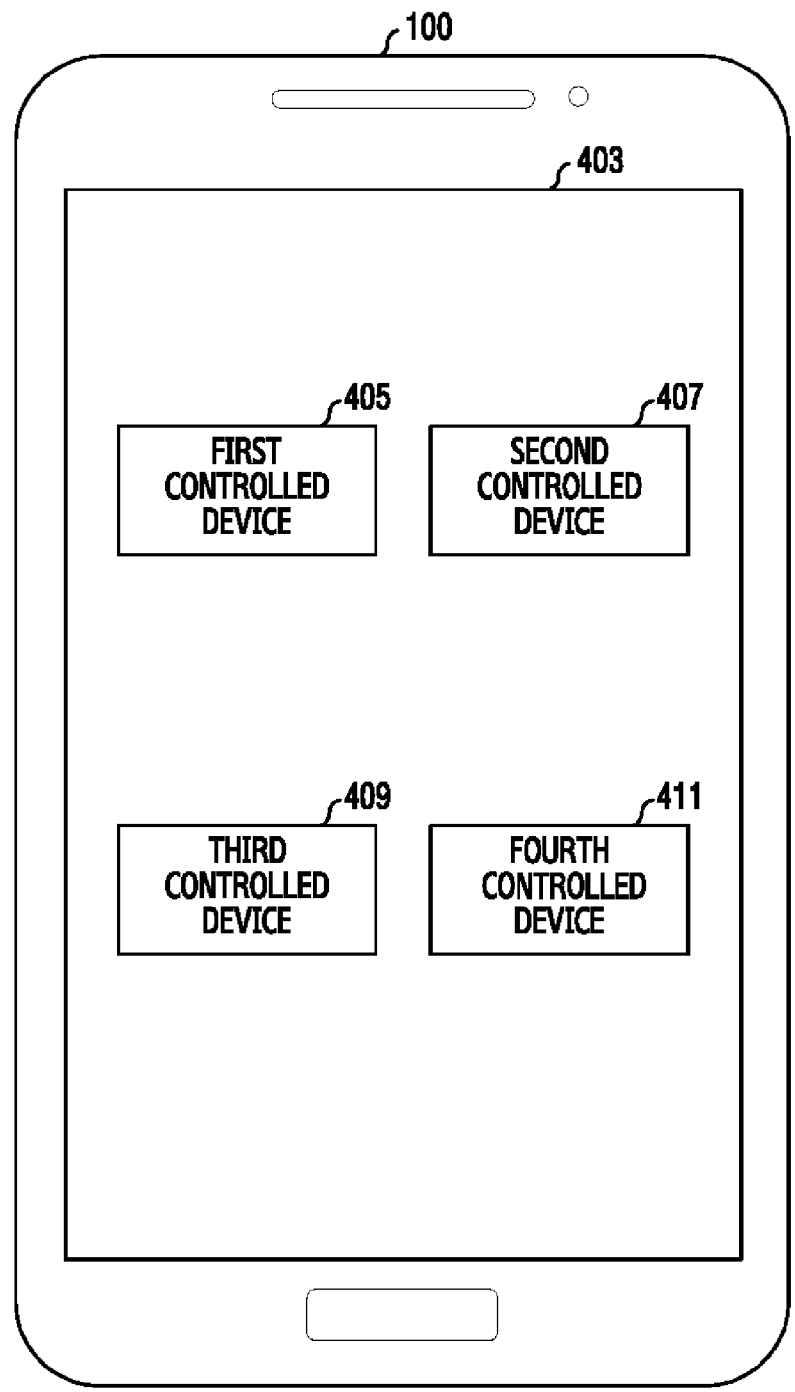

[Fig. 4b]
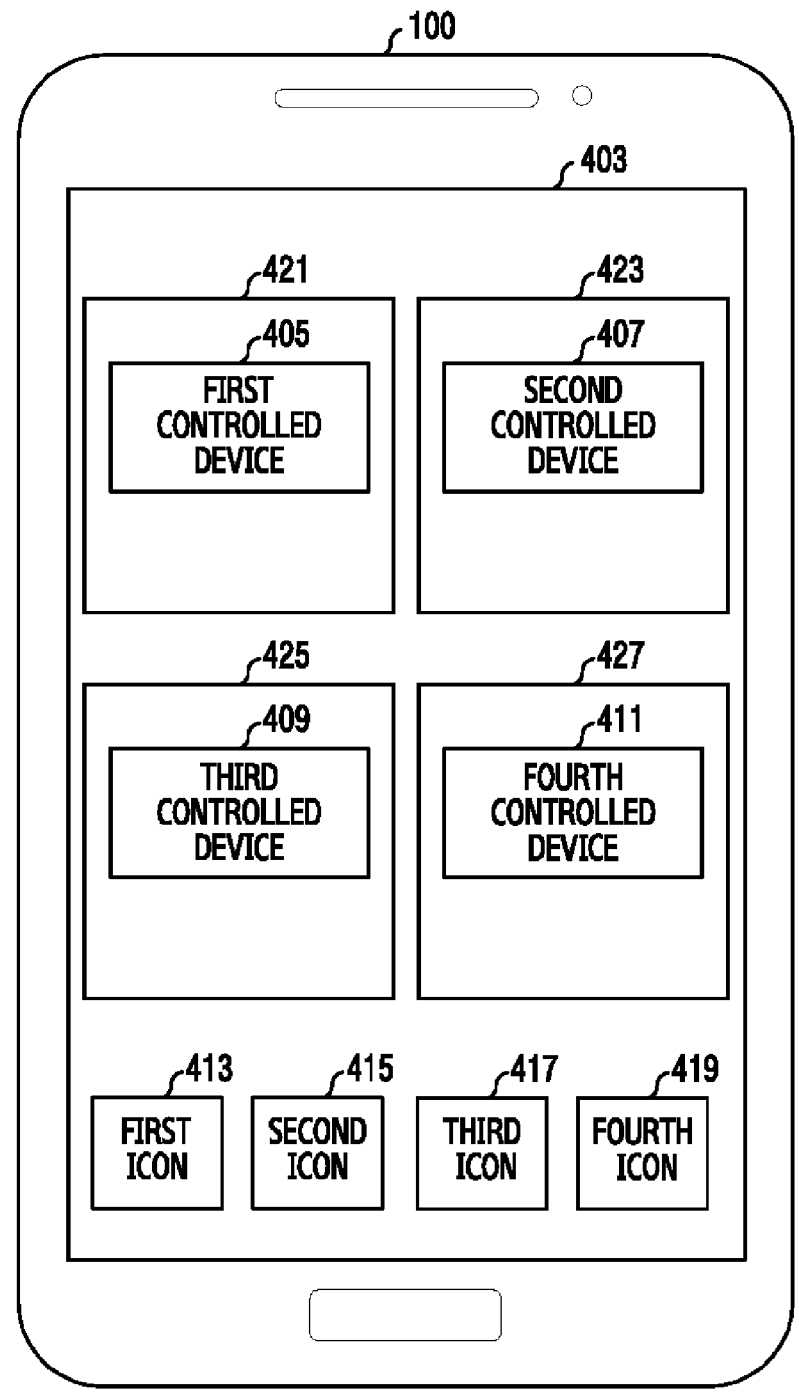

[Fig. 4c]
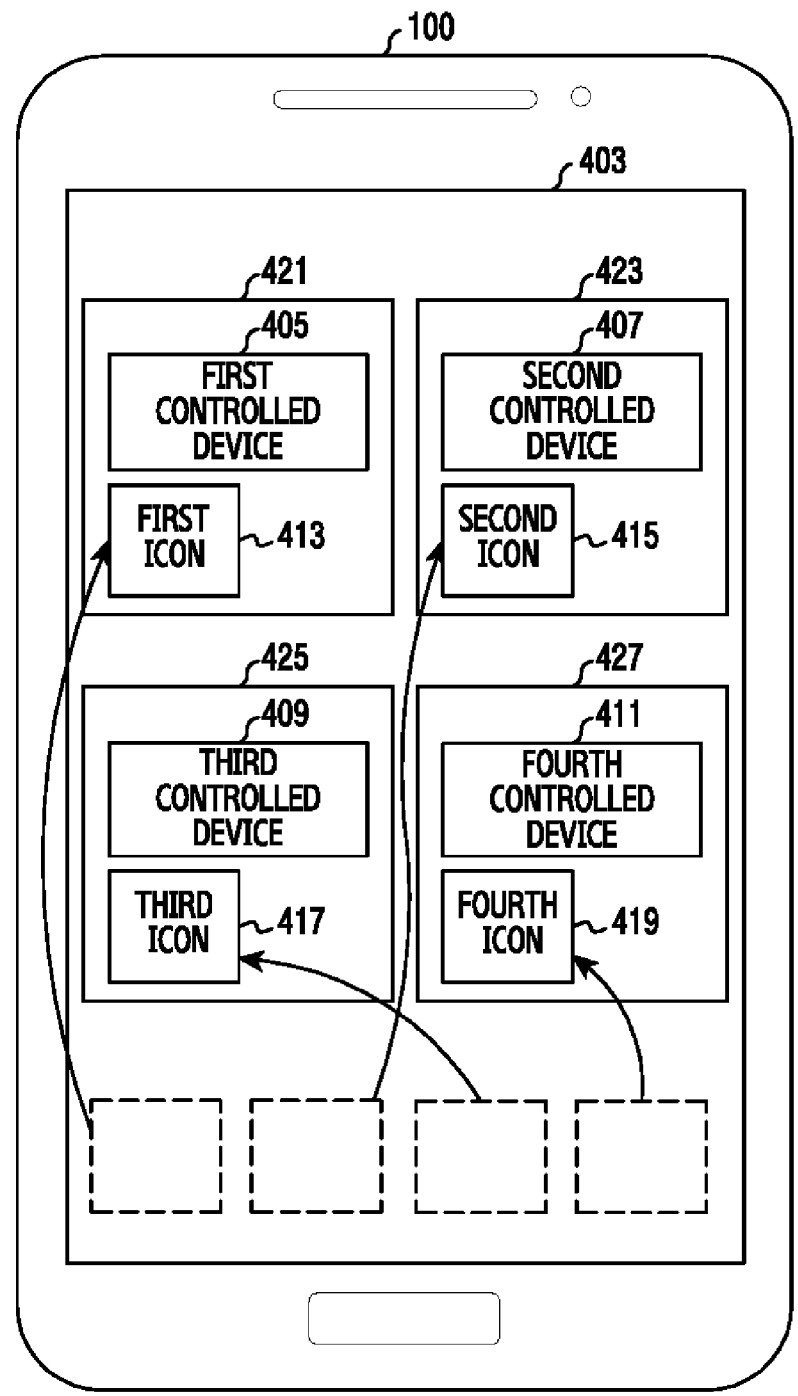

[Fig. 5a]
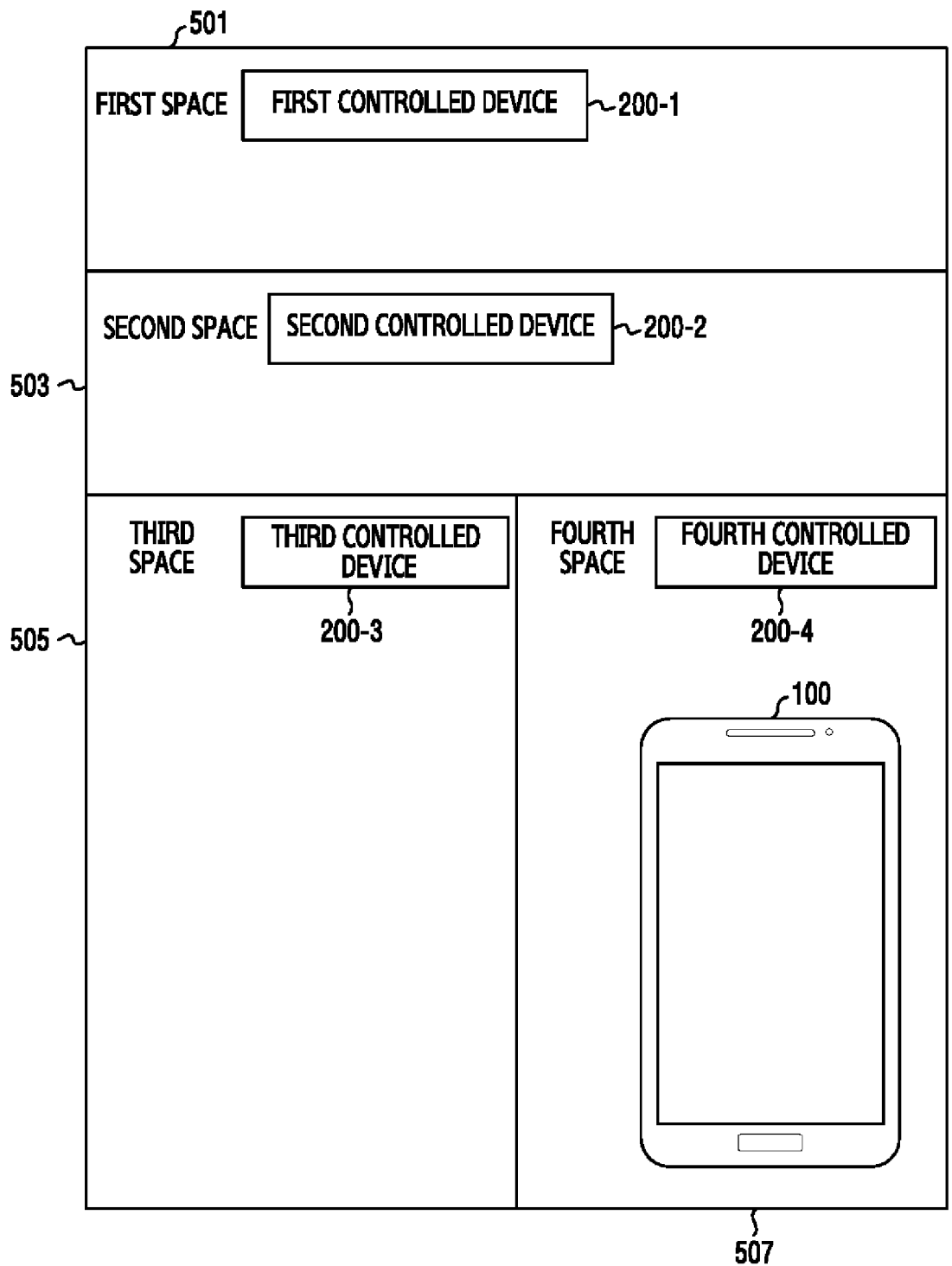

[Fig. 5b]
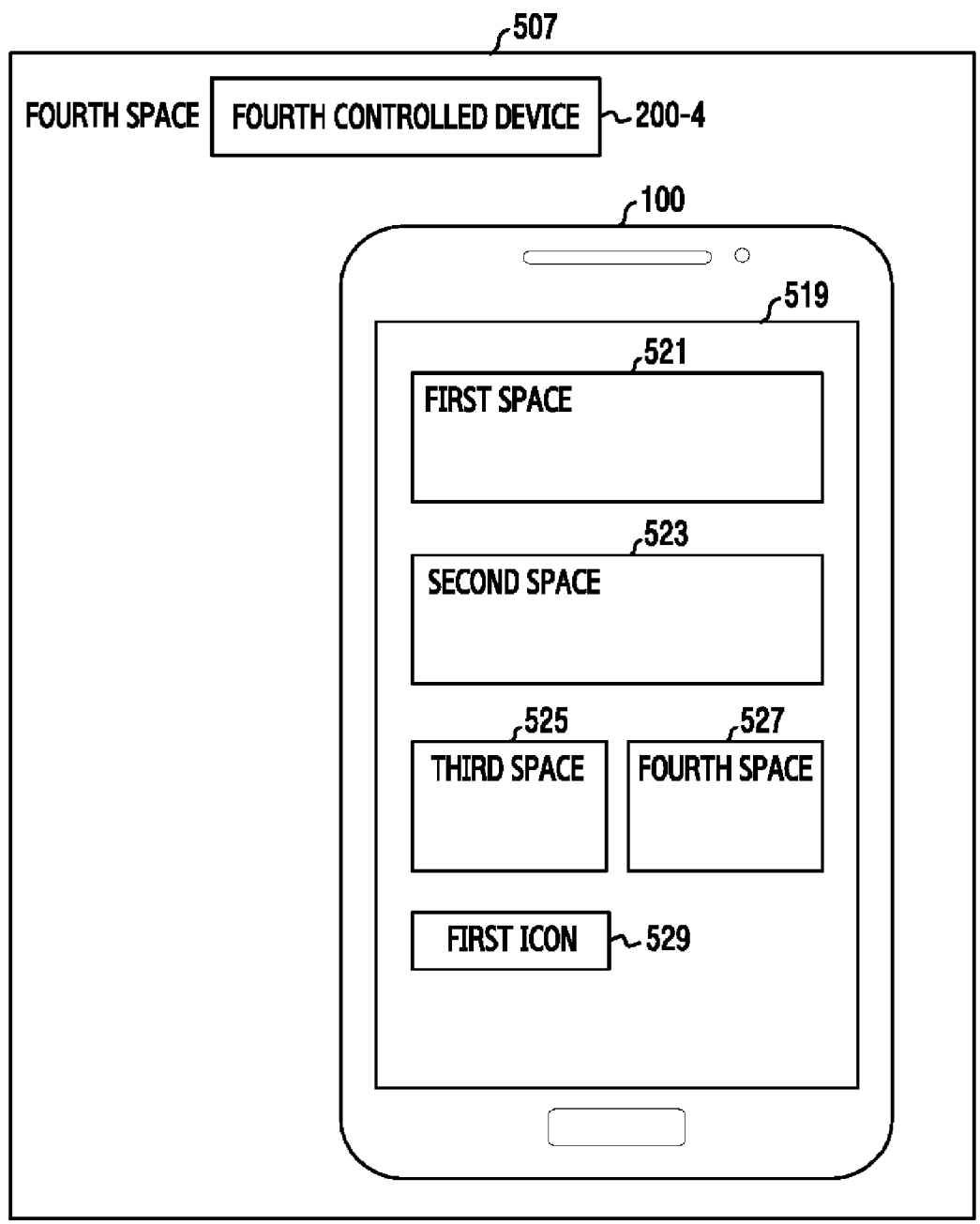

[Fig. 6a]
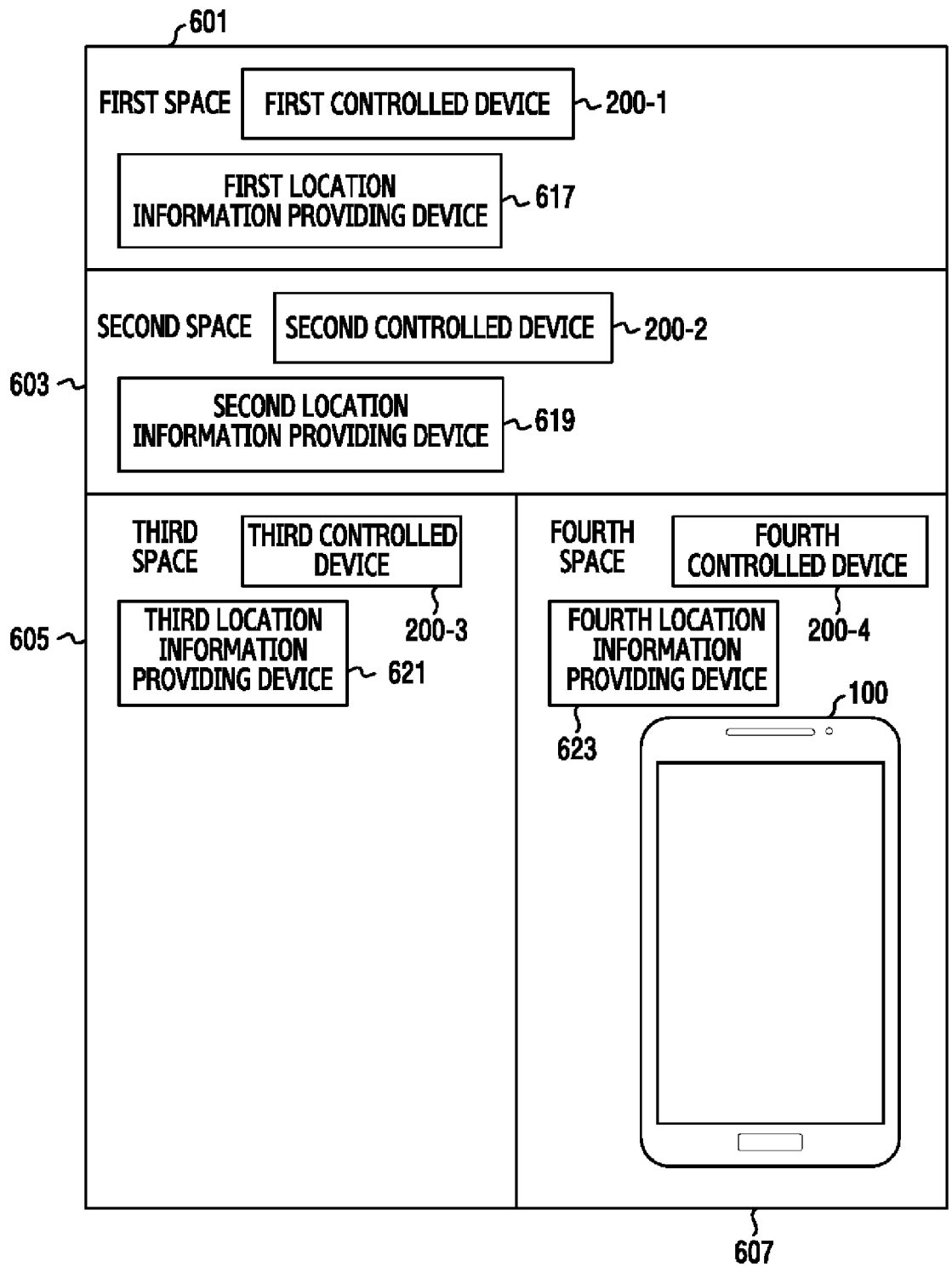

[Fig. 6b]
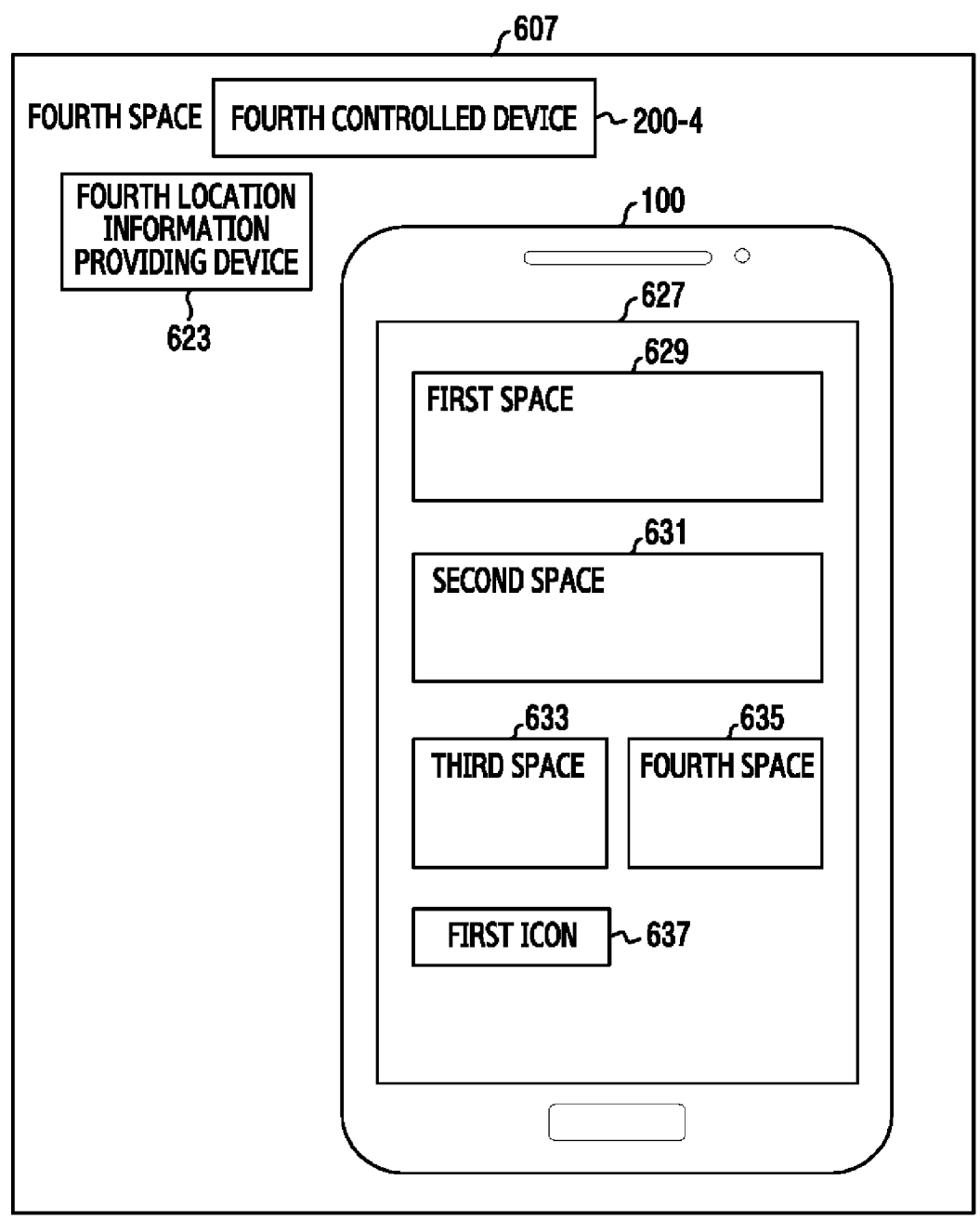

[Fig. 6c]
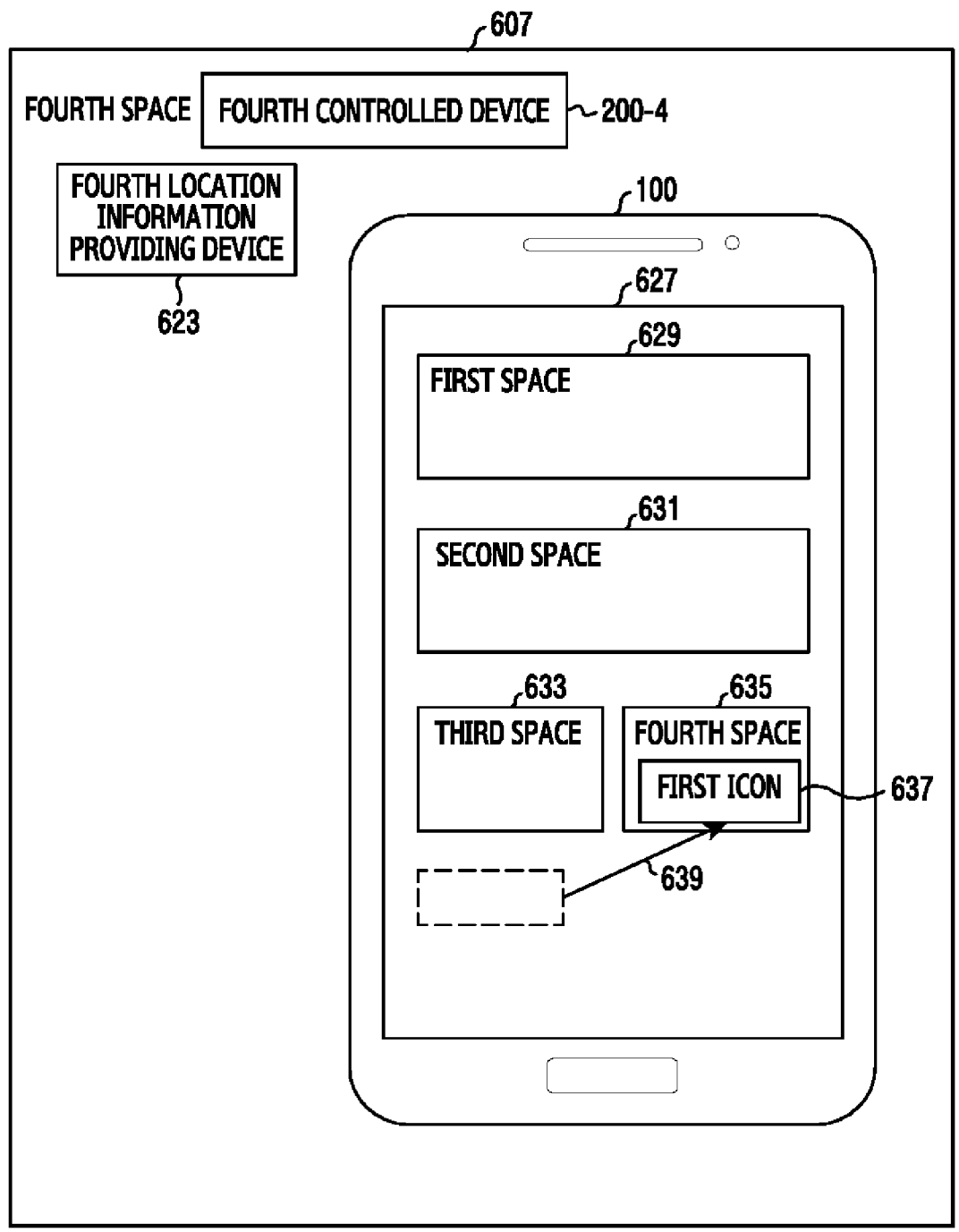

[Fig. 7a]
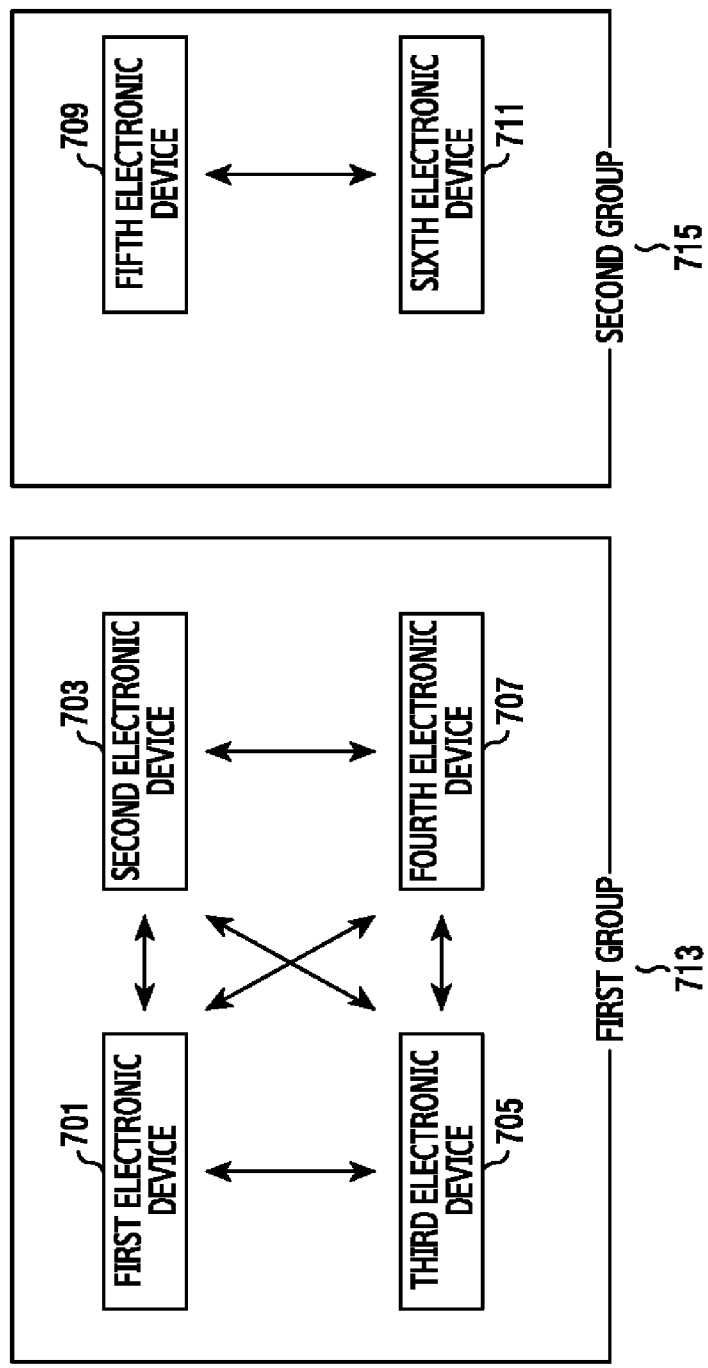

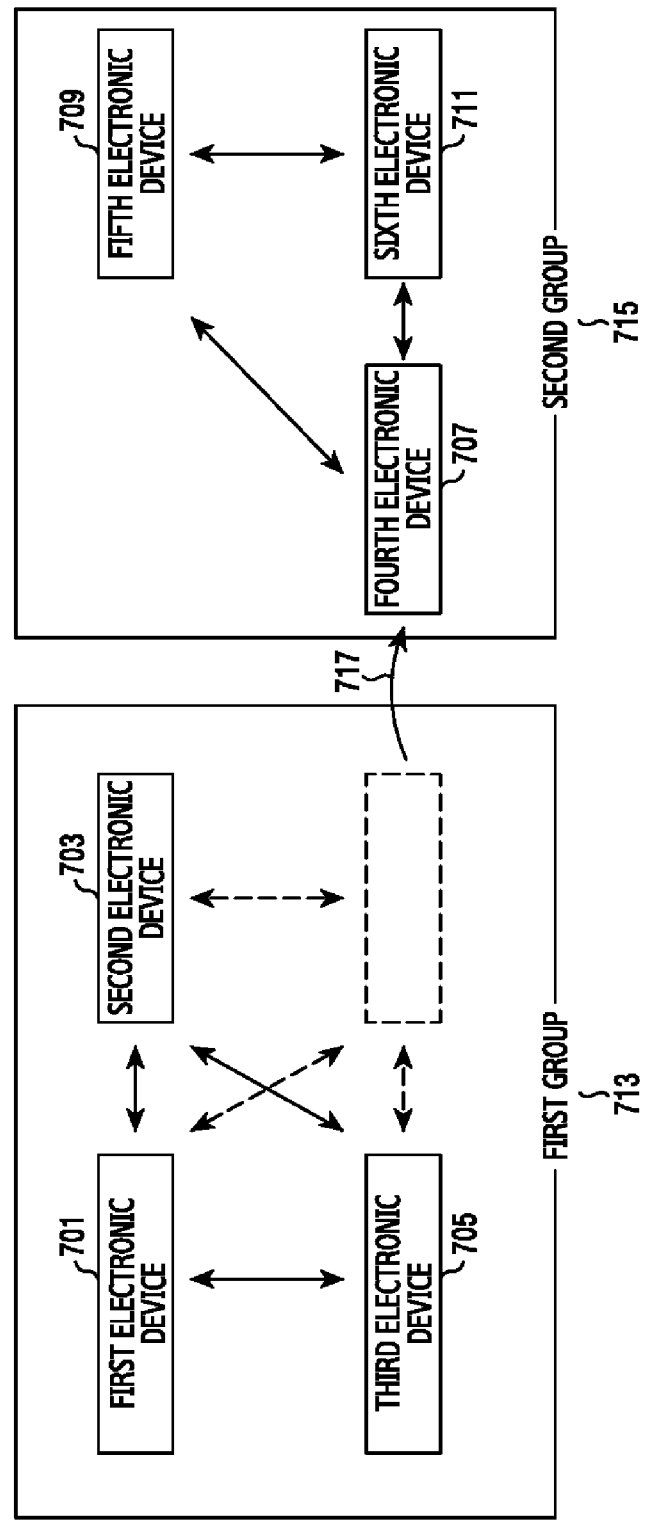
[Fig. 7b]

[Fig. 8]
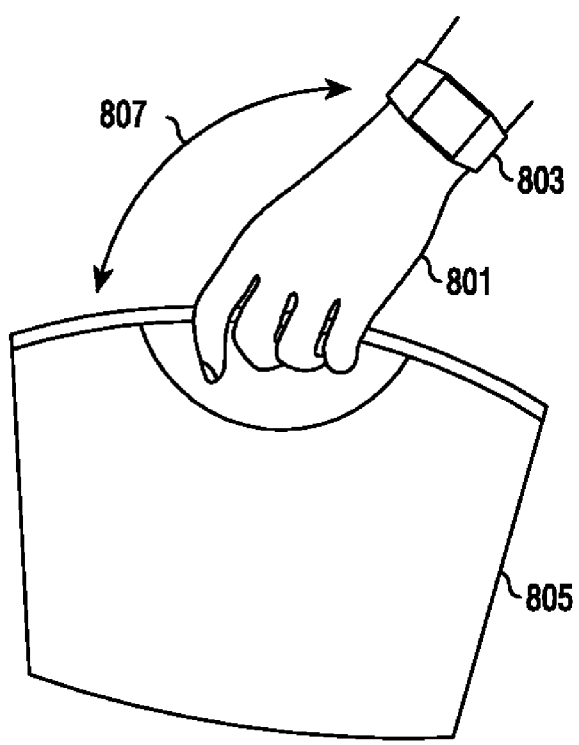

[Fig. 9]
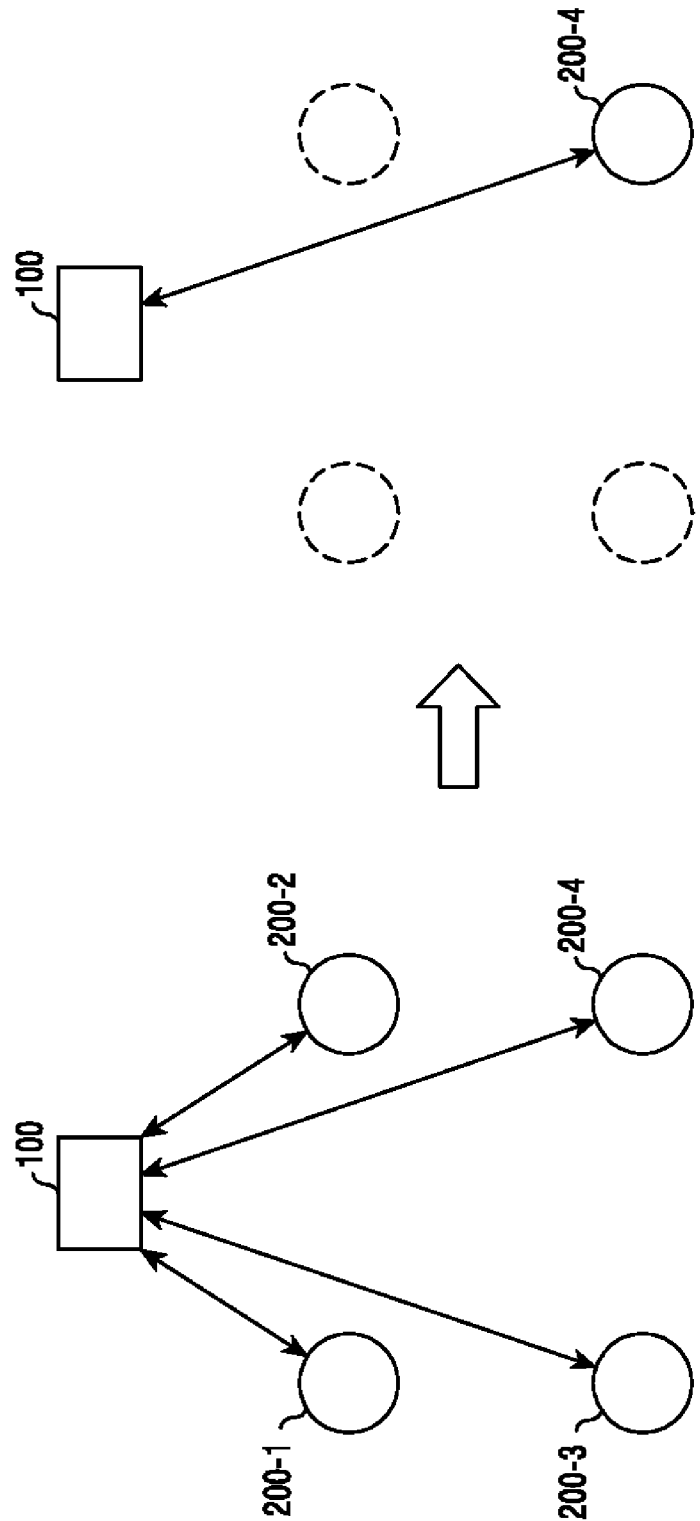

[Fig. 10]
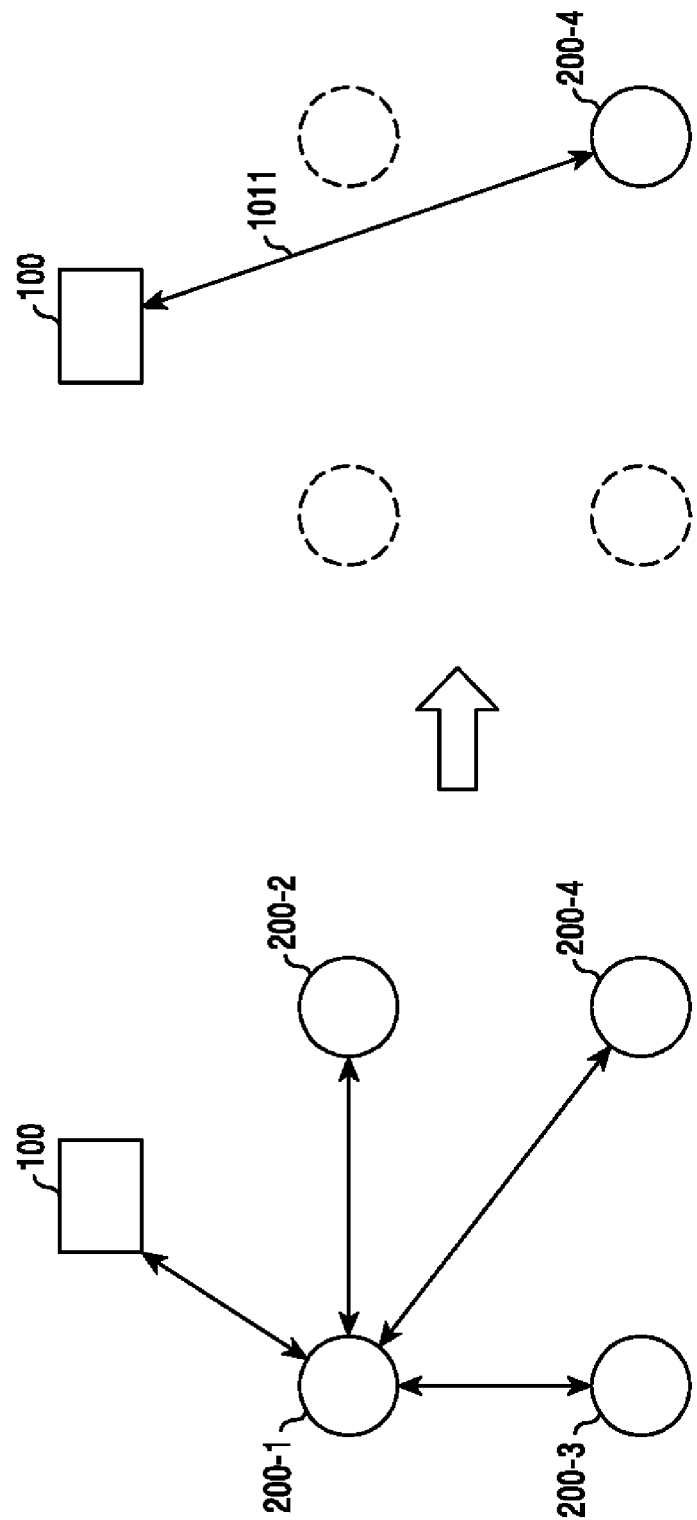

[Fig. 11]
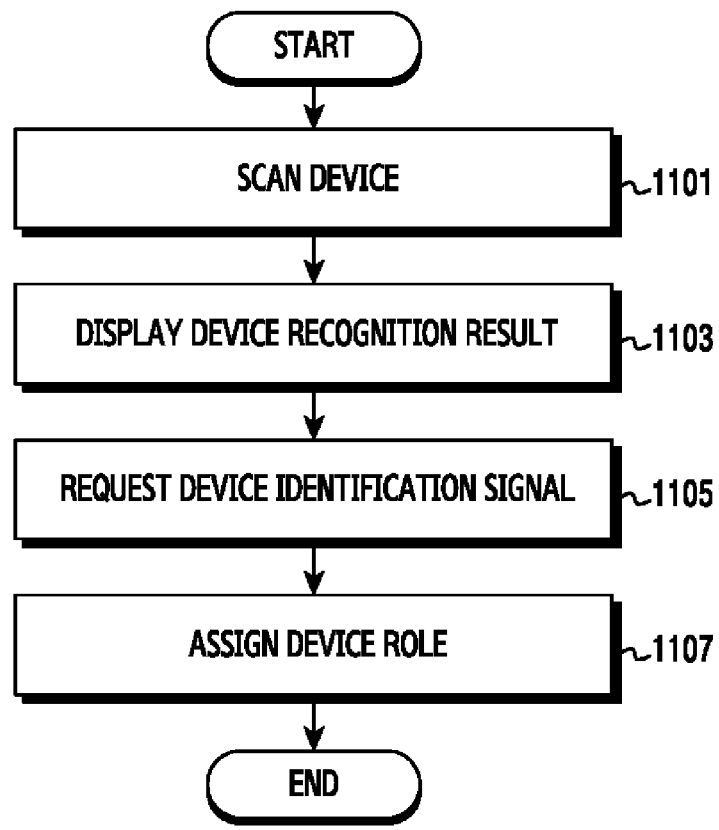

[Fig. 12]
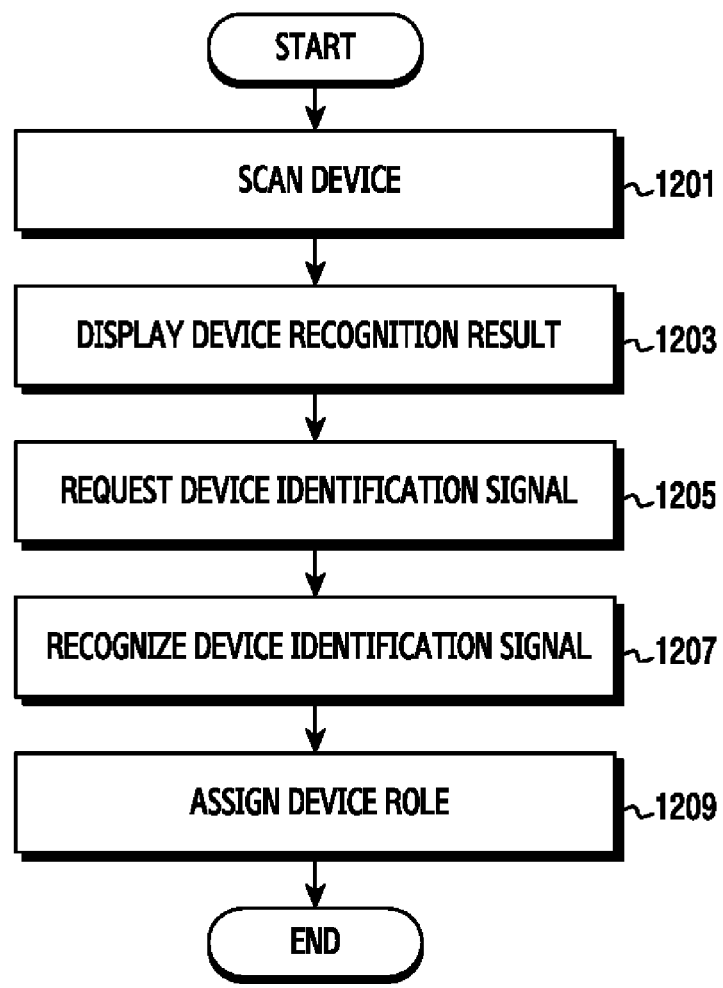

[Fig. 13]
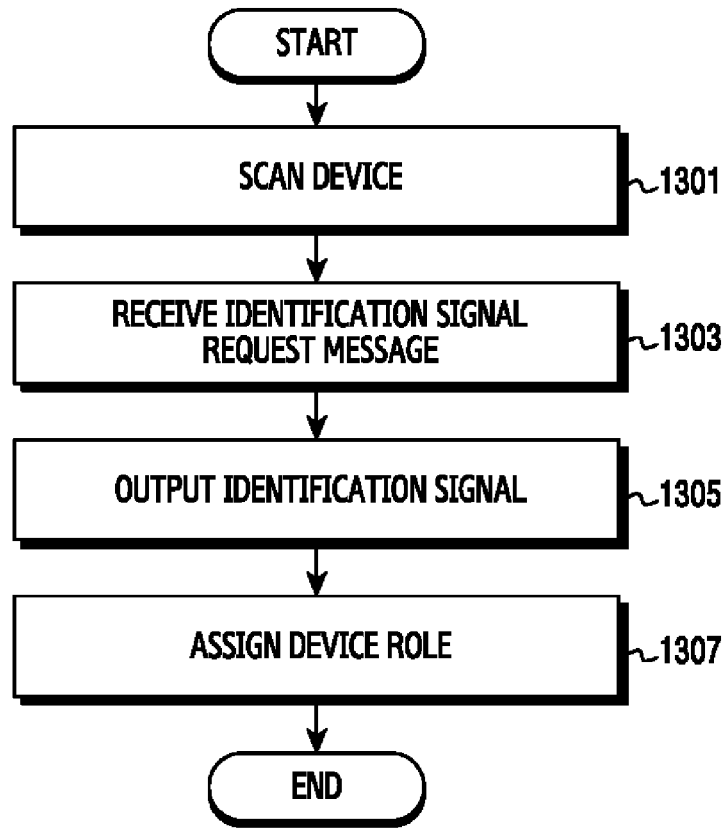
[Fig. 14]
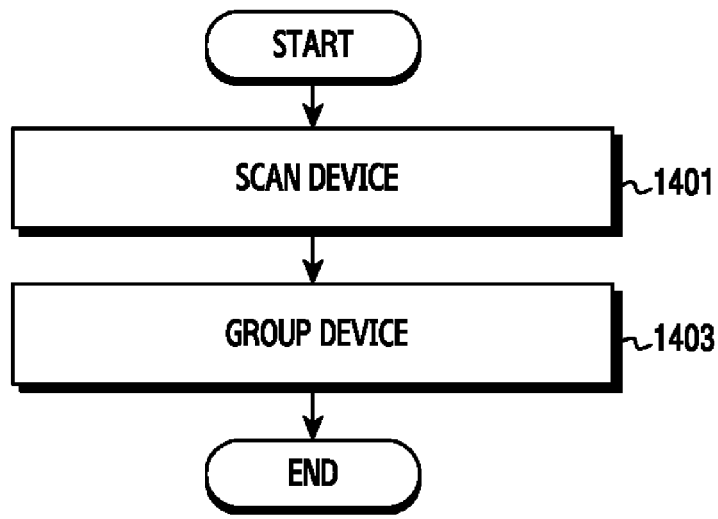

[Fig. 16]
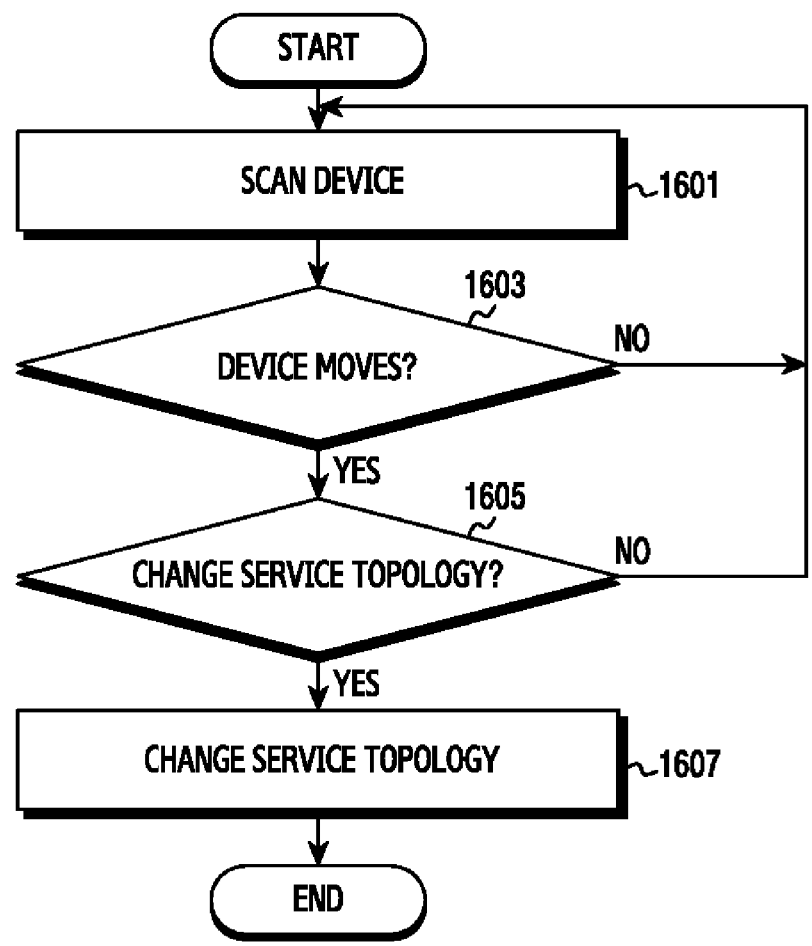

[Fig. 17]
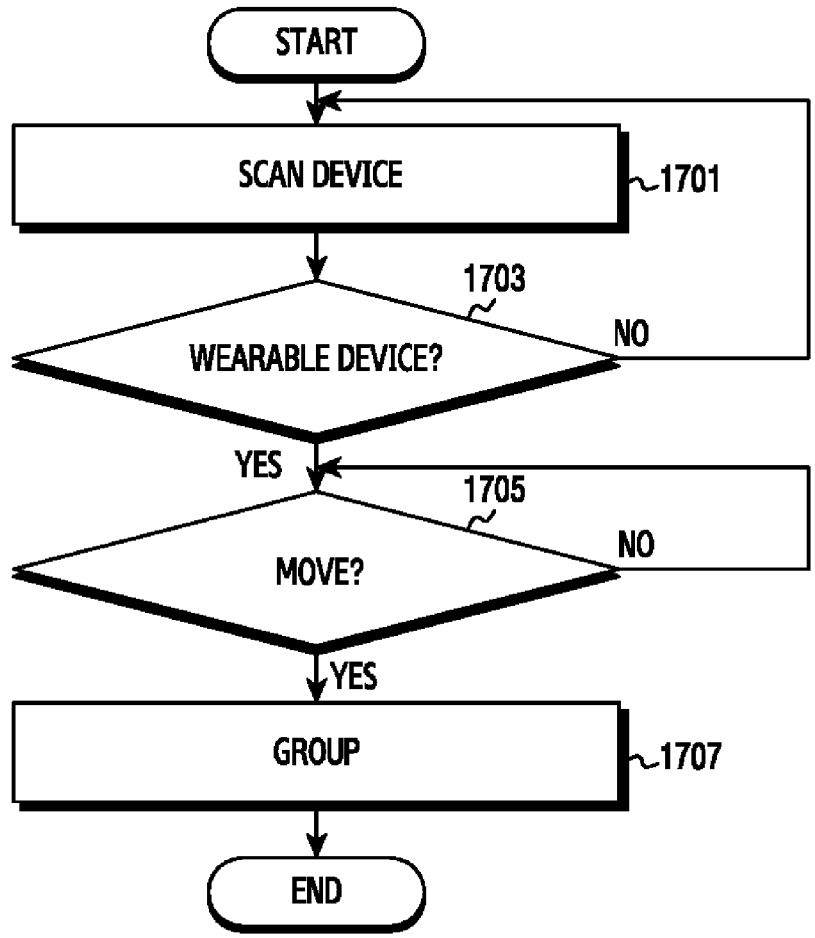
[Fig. 18]
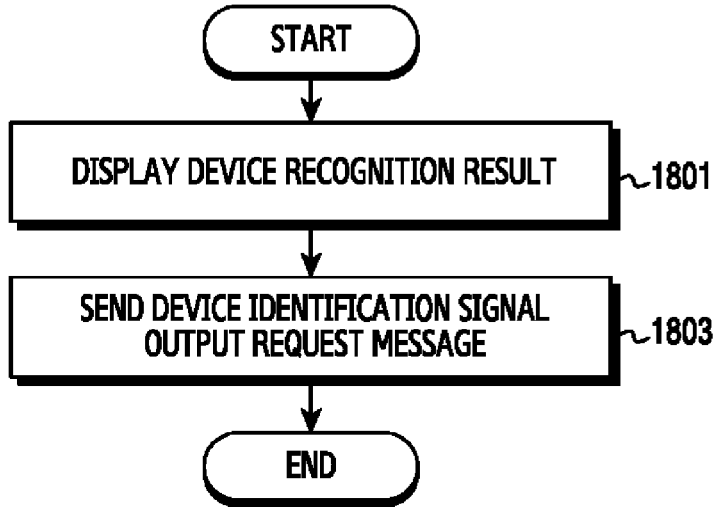

[Fig. 19]
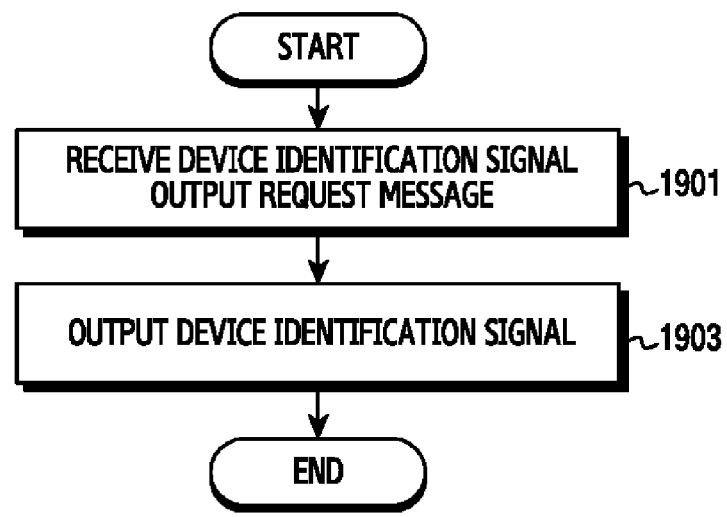

[Fig. 20]
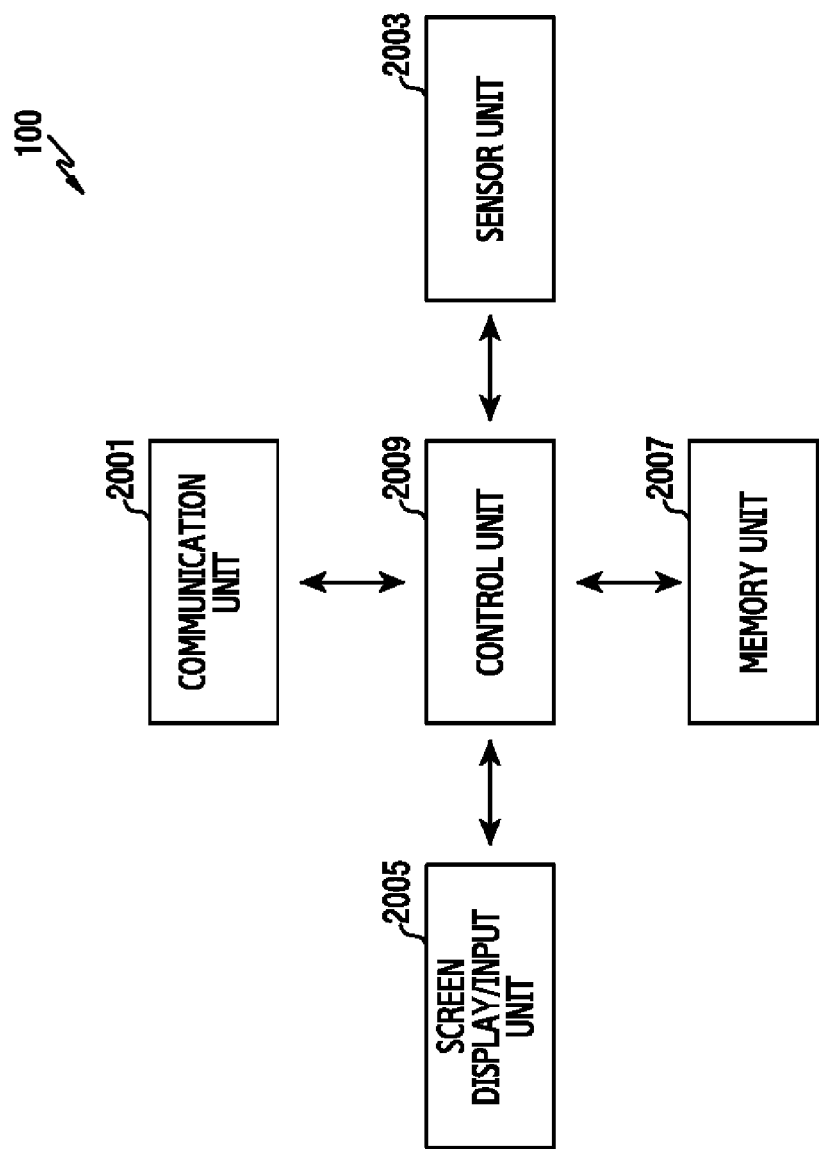

[Fig. 21]
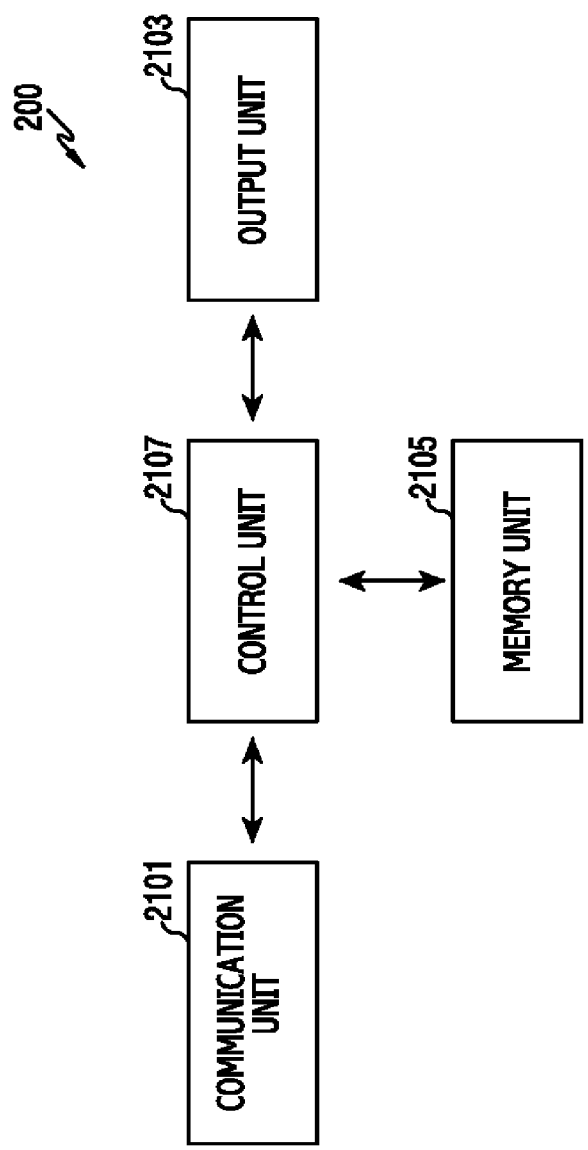

APPARATUS AND METHOD FOR CONTROLLING OTHER ELECTRONIC DEVICE IN ELECTRONIC DEVICE

PRIORITY

This application is a National Phase Entry of PCT International Application No. PCT/KR2015/004222, which was filed on Apr. 28, 2015, and claims priority to Korean Patent Application No. 10-2014-0051743, which was filed on Apr. 29, 2014, the contents of each of which are incorporated herein by reference.

TECHNICAL FIELD

The present disclosure relates generally to wireless communication. More particularly, the present disclosure relates to apparatus and method for controlling other electronic device in electronic device.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Thanks to advances in communication technologies, a user can remotely configure an electronic device using wired or wireless techniques, rather than directly configuring through an input unit of the electronic device. Referring to FIG. 1, FIG. 1 depicts an interface for controlling speakers 103, 105, 107, 109, 111, 113, 115 and 117. Referring to FIG. 1, the interface includes an interface 101 of a controlling device for configuring the speakers, and a plurality of speakers 103 through 117. The user can configure functions corresponding to locations of the speakers 103 through 117 through the interface 101. When at least one of the speakers 103 through 117 is moved to a different location, the user can reconfigure the function corresponding to the location of the at least one moved speaker through the interface 101. The user can configure data of service topology of the other speakers due to the movement of the at least one speaker through the interface 101. However, to configure the devices in the aforementioned manner, the user needs to know mapping relation among the devices displayed in the interface 101 and physical devices. That is, the user needs to recognize Identification (ID) or Serial Number (SN) of the device to configure. Also, every time the device is moved, it is inconvenient to configure service topology of the device. Referring to FIG. 1, the interface and the configuration for controlling the speaker are illustrated. As discussed above, the user needs to check the device information in person for the configuration and the control. The same shortcoming can arise when other electronic device than the speaker of FIG. 1 is controlled.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies of the prior art, it is a primary aspect of the present disclosure to provide an apparatus and a method for intuitively recognizing other electronic device, in an electronic device.

Another aspect of the present disclosure is to provide an apparatus and a method for detecting and configuring other electronic device according to a location of the other electronic device, in an electronic device.

Yet another aspect of the present disclosure is to provide an apparatus and a method for detecting and grouping movement of other electronic device, in an electronic device.

According to an aspect of the present disclosure, an electronic device includes a display unit for displaying a result of recognizing at least one other electronic device as at least one item, and a communication unit for sending a message requesting the at least one other electronic device to output an identifiable signal.

According to an aspect of the present disclosure, an electronic device includes a display unit for displaying a result of recognizing the at least one other electronic device as at least one item, and a communication unit for receiving location information from an electronic device which provides at least one location information.

According to an aspect of the present disclosure, an electronic device includes a communication unit for sending and receiving a signal for recognizing at least one other electronic device and data to and from the at least one other electronic device, and a control unit for controlling to form a group with the at least one other electronic device.

According to an aspect of the present disclosure, an electronic device includes a communication unit for receiving a message requesting to output an identifiable signal, from other electronic device, and an output unit for outputting the identifiable signal.

According to an aspect of the present disclosure, a method for operating an electronic device includes displaying a result of recognizing at least one other electronic device as at least one item, and sending a message requesting the at least one other electronic device to output an identifiable signal.

According to an aspect of the present disclosure, a method for operating an electronic device includes displaying a result of recognizing the at least one other electronic device as at least one item, and receiving location information from an electronic device which provides at least one location information.

According to an aspect of the present disclosure, a method for operating an electronic device includes sending and receiving a signal for recognizing at least one other electronic device and data to and from the at least one other electronic device, and forming a group with the at least one other electronic device.

According to an aspect of the present disclosure, a method for operating an electronic device includes receiving a message requesting to output an identifiable signal, from other electronic device, and outputting the identifiable signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other aspects, features, and advantages of certain exemplary embodiments of the present disclosure will be more apparent from the following description taken in conjunction with the accompanying drawings, in which:

FIG. 1 illustrates an interface for controlling a speaker;

FIG. 2 illustrates a controlling device and controlled devices according to an exemplary embodiment of the present disclosure;

FIGS. 3A and 3B illustrate an electronic device for recognizing and controlling other electronic device according to an exemplary embodiment of the present disclosure;

FIGS. 4A through 4C illustrate an electronic device for recognizing and controlling other electronic device according to another exemplary embodiment of the present disclosure;

FIGS. 5A through 5C illustrate an electronic device for recognizing and controlling other electronic device according to yet another exemplary embodiment of the present disclosure;

FIGS. 6A through 6C illustrate an electronic device for recognizing and controlling other electronic device according to still another exemplary embodiment of the present disclosure;

FIGS. 7A and 7B illustrate grouping with other electronic device in an electronic device according to an exemplary embodiment of the present disclosure;

FIG. 8 illustrates the electronic device associated with a wearable device according to an exemplary embodiment of the present disclosure;

FIG. 9 illustrates service topology with other electronic devices in the electronic device according to an exemplary embodiment of the present disclosure;

FIG. 10 illustrates service topology with other electronic devices in the electronic device according to another exemplary embodiment of the present disclosure;

FIG. 11 illustrates a flow chart for recognizing and configuring the other electronic device in the electronic device according to an exemplary embodiment of the present disclosure;

FIG. 12 illustrates a flow chart for detecting and configuring the other electronic device in the electronic device according to another exemplary embodiment of the present disclosure;

FIG. 13 illustrates a flow chart of operations of the other electronic device according to an exemplary embodiment of the present disclosure;

FIG. 14 illustrates a flow chart for grouping with the other electronic device in the electronic device according to an exemplary embodiment of the present disclosure;

FIG. 16 illustrates a flow chart for setting the service topology with the other electronic device in the electronic device according to an exemplary embodiment of the present disclosure;

FIG. 17 illustrates a flow chart for grouping with the other electronic device in the electronic device according to another exemplary embodiment of the present disclosure;

FIG. 18 illustrates a flow chart of operations of the electronic device according to an exemplary embodiment of the present disclosure;

FIG. 19 illustrates a flow chart of operations of the other electronic device controlled by the electronic device according to an exemplary embodiment of the present disclosure;

FIG. 20 illustrates a block diagram of the electronic device according to an exemplary embodiment of the present disclosure; and FIG. 21 illustrates a block diagram of the other electronic device according to an exemplary embodiment of the present disclosure.

Throughout the drawings, like reference numerals will be understood to refer to like parts, components and structures.

DETAILED DESCRIPTION

Figure 5C:
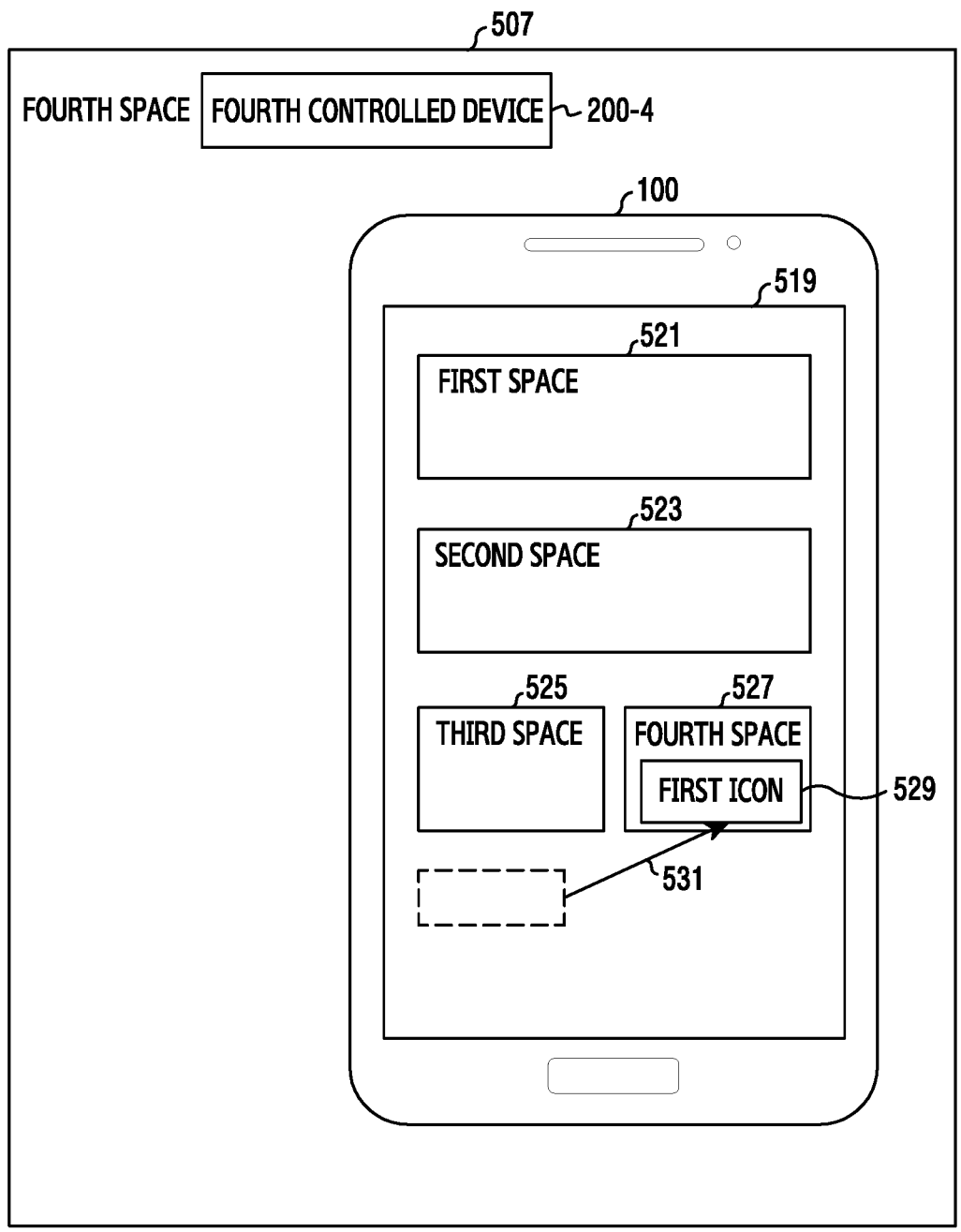

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present disclosure is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for initially setting other electronics device and recognizing movement of the other electronic device in an electronic device.

Hereinafter, the electronic device for controlling the other electronic device is referred to as a controlling device. Also, hereinafter, the other electronic device controlled by the controlling device is referred to as a controlled device.

FIG. 2 depicts a controlling device and controlled devices according to an exemplary embodiment of the present disclosure.

Referring to FIG. 2, the controlled devices 200-1 through 200-4 and the controlling device 100 are depicted.

The controlled devices 200-1 through 200-4 have communication functionality for communicating with the controlling device 100. The controlled devices 200-1 through 200-4 each can provide at least one function corresponding to their device characteristics and controlled by the controlling device 100. For example, the controlled devices 200-1 through 200-4 can include a speaker, a light, a washing machine, a refrigerator, a television (TV), an audio, a game console, a Personal Computer (PC), an automatic curtain, an oven, a robot cleaner, an air conditioner, a dishwasher, a Closed Circuit TV (CCTV), and a multivision.

The controlling device 100 is a device having the communication functionality for communicating with the controlled devices 200-1 through 200-4. The controlling device 100 can control at least one function provided from the controlled devices 200-1 through 200-4. The controlling device 100 includes an input means (e.g., a button, a touch screen, etc.) for processing a user's input, and a communication means for communicating with the controlled devices 200-1 through 200-4. For example, the controlling device 100 can include one of a smart phone, a portable terminal, a mobile phone, a mobile pad, a media player, a tablet computer, a handheld computer, a Personal Digital Assistant (PDA), a desktop computer, and a wireless controller. Also, the controlling device 100 can combine two or more functions of these devices.

The controlling device 100 and the controlled devices 200-1 through 200-4 perform mutual scanning. That is, the controlling device 100 determines whether the controlled devices 200-1 through 200-4 are located at a controllable distance. For example, the controlling device 100 sends a preset signal. Hence, the controlled devices 200-1 through 200-4 can detect the preset signal and then send a response. Through the scanning process, a distance between the controlling device 100 and the controlled devices 200-1 through 200-4 can be measured. The distance can be measured using a Received Signal Strength Indication (RSSI) or an audio time stamp between the controlling device 100 and the controlled devices 200-1 through 200-4.

According to another embodiment of the present disclosure, the controlling device 100 can recognize the controlled devices 200-1 through 200-4 using at least one of Bluetooth, Bluetooth Low Energy (BLE), and Near Field Communication (NFC).

The controlling device 100 and the controlled devices 200-1 through 200-4 mutually recognize each other through the scanning process and establish mutual communication connection. For example, the communication connection between the controlling device 100 and the controlled devices 200-1 through 200-4 can be established based on at least one of Wireless Fidelity (Wi-Fi), Wireless Gigabit Alliance (WiGig), Zigbee, Ultra WideBand (UWB), Infrared Data Association (IrDA), Visible Light Communication (VLC), Global System for Mobile communications (GSM), Enhanced Data rates for GSM Evolution (EDGE), Code Division Multiple Access (CDMA), and Long Term Evolution (LTE).

According to another embodiment of the present disclosure, the controlling device 100 can send and receive signals for mutually recognizing the controlled devices 200-1 through 200-4 through at least one of the Bluetooth, BLE, and NFC, and send and receive data signals by activating a communication module using at least one of Wi-Fi, the WiGig, the Zigbee, the UWB, the IrDA, the VLC, the GSM, the EDGE, the CDMA, and the LTE of the controlled devices 200-1 through 200-4.

The controlled devices 200-1 through 200-4 and the controlling device 100 can exchange device information. For example, the device information includes connectivity information, service information, device unique ID information, device type information, and device name. For example, the connectivity information includes a device role, authentication information, connected device information, and connected group information. The service information includes service and application supportable by the controlled devices 200-1 through 200-4, and service information to execute. For example, the device unique ID information includes a Bluetooth device address and a Wi-Fi Media Access Control (MAC) address. For example, the device type information is information indicating the type of the device. For example, the device type can include a speaker, a light, a washing machine, a refrigerator, a TV, an audio, a game console, a PC, an automatic curtain, an oven, a robot cleaner, an air conditioner, a dishwasher, a CCTV, and a multivision.

The controlling device 100 can recognize the controlled devices 200-1 through 200-4 based on the device information received from the controlled devices 200-1 through 200-4.

According to another embodiment of the present disclosure, the controlling device 100 can recognize the controlled devices 200-1 through 200-4 using WiGig or Infrared (IR) communication.

FIG. 2 depicts four controlled devices. However, according to another embodiment of the present disclosure, the controlling device can control three or less or five or more controlled devices.

FIGS. 3A and 3B depict an electronic device for detecting and controlling other electronic device according to an exemplary embodiment of the present disclosure.

In FIGS. 3A and 3B, a controlling device 100 controls four controlled devices 200-1 through 200-4.

Referring to FIG. 3A, the controller 100 recognizes the controlled devices 200-1 through 200-4 and receives the device information from the controlled devices 200-1 through 200-4. Hence, the controlling device 100 displays a peripheral recognition result in a display 303 of the controlling device 100. According to an embodiment of the present disclosure, the peripheral recognition result can be displayed using icons 313 through 319 indicating a type of the controlled devices 200-1 through 200-4. For example, when the controlled devices 200-1 through 200-4 are speakers, the icons 313 through 319 indicating the controlled devices can have a speaker shape. For example, when the controlled devices 200-1 through 200-4 are lights, the icons 313 through 319 can have a light shape.

According to an embodiment of the present disclosure, the icons 313 through 319 can be displayed in order of recognizing the corresponding controlled devices in the controlling device 100. For example, when the controlling device 100 recognizes the controlled devices 200-1 through 200-4 in order of the first controlled device 200-1, the second controlled device 307, the third controlled device 309, and the fourth controlled device 200-4, the controlling device 100 can sequentially display the first icon 313, the second icon 315, the third icon 317, and the fourth icon 319 corresponding to the recognition result in the recognition order.

According to another embodiment of the present disclosure, the peripheral recognition result can be displayed in a different fashion from the icons 313 through 319. For example, the peripheral recognition result can be displayed in a different fashion, rather than displaying in the recognition order of the controlled devices 200-1 through 200-4. For example, the controlling device 100 can display the icons 313 through 319 all together, regardless of the recognition order of the controlled devices 200-1 through 200-4.

According to another embodiment of the present disclosure, the peripheral recognition result can be displayed in a different fashion from the icons 313 through 319. For example, the recognition result of the controlled devices 200-1 through 200-4 can be displayed in a list. For example, the peripheral recognition result can be displayed as the list arranging the identification information of the controlled devices 200-1 through 200-4. For example, the identification information can include the ID and the SN. Hereafter, to ease the understanding, the icons 313 through 319 are displayed by way of example.

While the controlling device 100 recognizes the controlled devices 200-1 through 200-4, the user cannot know which controlled devices the icons 313 through 319 correspond to respectively. Accordingly, the controlling device 100 can control the controlled devices 200-1 through 200-4 to output an identification signal so that the user can recognize the correspondence between the controlled devices 200-1 through 200-4 and the icons 313 through 319. The identification signal is a signal agreed to be output from the controlled devices 200-1 through 200-4. The identification signal can be defined variously according to embodiments. For example, the identification signal can be defined as at least one of light, sound, and image. Also, the same or different identification signals can be defined for the controlled devices. For example, the identification signal can be identified using at least one of a light color, a light pattern, a light cycle, an signal, an audio signal pattern, and an audio signal cycle.

According to an embodiment of the present disclosure, the controlling device 100 can display the icons 313 through 319 and then display the correspondence between the icons 313 through 319 and the controlled devices 200-1 through 200-4 corresponding to the icons 313 through 319 so that the user can recognize it. For example, the controlling device 100 can display the icons 313 through 319 in the display 303 of the controlling device 100 and then control the first controlled device 200-1 to display the light signal, as the identification signal, through a display means of the first controlled device 200-1. For example, the controlling device 100 can send a request message for requesting to output the identification signal, to the first controlled device 200-1. For example, the request message can notify the output request of the identification signal, and include information notifying at least one of a type, a content, and a display type (e.g., a duration time and a repetition count) of the identification signal. In so doing, the controlling device 100 displays the first icon 313 which is the recognition result display of the first controlled device 200-1, to be distinguished from the other icons 315, 317, and 319 so that the user can obtain the correspondence of the first controlled device 200-1 displaying the light signal and the first icon 313. For example, the controlling device 100 can display the first icon 313 to be distinguished from the other icons 315, 317, and 319 by flickering, moving, or changing the color of the first icon 313. The controlled devices 200-1 through 200-4 output the identification signal under the control of the controlling device 100.

According to another embodiment of the present disclosure, the controlling device 100 can control to output the identification signal according to a user's command. For example, when the user selects the first icon 313 among the icons 313 through 319 displayed in the display 303, the controlling device 100 can control the first controlled device 200-1 corresponding to the first icon 313 to output the identification signal.

Referring to FIG. 3B, the controlling device 100 can display the icons 313 through 319 and role setting windows 321 through 327 in the display 303.

The role setting windows 321 through 327 are interfaces for setting the role of the controlled devices 200-1 through 200-4 in association with the icons 313 through 319. That is, the user can assign the roles to the controlled devices 200-1 through 200-4 respectively in the role setting windows 321 through 327.

For example, when the user touches and drags the first icon 313 displayed in the display 303 of the controlling device 100 and drops it into the first role setting window 321, the first controlled device corresponding to the first icon 313 is set to perform the role corresponding to the first role setting window. For example, when the first controlled device through the fourth controlled device are speakers, the user can assign the front-left speaker role in the first role setting window 321. Also, the user can assign the front-right speaker role in the second role setting window 323, the back-left speaker role in the third role setting window 325, and the back-right speaker role in the fourth role setting window 327. In so doing, when the user puts the first icon 313 in the first role setting window 321, the first controlled device is configured to serve the front-left speaker role corresponding to the first role window 321.

When the user touches the first icon 313 in the first role setting window 321, the first controlled device 200-1 performs the role corresponding to the role of the first role setting window 321. For example, when the first controlled device 200-1 is a speaker, as the user touches the first icon 313, the first controlled device 200-1 outputs the audio according to the assigned role.

According to another embodiment of the present disclosure, when the user touches the first icon 313 in the first role setting window 321, the controlling device 100 can display an interface for controlling the first controlled device 200-1 in the display 303. For example, when the first controlled device 200-1 is a TV and the user touches the first icon 313 in the first role setting window 321, the controlling device 100 can display the interface for controlling TV power activation/deactivation, volume control, and channel control in the display 303. Configuration of the interface for controlling the controlled device can vary according to the type of the controlled device. For example, when the controlled device is an air conditioner, the interface can include the configuration for controlling the temperature. For example, when the controlled device is a speaker, the interface can include the configuration for setting speaker volume, mono, stereo, surround, center speaker, and sub woofer.

FIGS. 3A and 3B depict four controlled devices. However, according to another embodiment of the present disclosure, three or less or five or more controlled devices can be controlled by the controlling device. Also, FIG. 2 depicts four role setting windows. However, according to another embodiment of the present disclosure, three or less or five or more role setting windows can be present.

In FIG. 3A and FIG. 3B, controlled devices 200-1 through 200-4 are speakers by way of example. However, according to embodiments of the present disclosure, the type of the controlled devices 200-1 through 200-4 can vary. For example, the controlled devices 200-1 through 200-4 can be multivisions. The multivision indicates a device for displaying a large screen by combining a plurality of display devices. The multivision includes a plurality of display devices including display means, and its role varies according to a relative location of each display device.

FIGS. 4A through 4C depict an electronic device for recognizing and controlling other electronic device according to another exemplary embodiment of the present disclosure.

FIGS. 4A through 4C depict that a controlling device 100 automatically controls four controlled devices 405 through 411.

Referring to FIG. 4A, the controlling device 100 outputs a screen captured by a camera, in a display 403. In so doing, the controlled devices 405 through 411 are captured and displayed in the display 403.

Referring to FIG. 4B, the controlling device 100 displays the icons 413 through 419 and role setting windows 421 through 427 in the display 403.

The role setting windows 421 through 427 are interfaces for setting the roles of the controlled devices 405 through 411 in association with the icons 413 through 419. That is, the controlling device 100 can assign the roles to the controlled devices 405 through 411 using the role setting windows 421 through 427. Also, the role setting windows 421 through 427 of FIG. 4B provide a criterion for determining locations of the controlled devices 200-1 through 200-4.

The controlling device 100 recognizes the controlled devices 405 through 411. In so doing, the controlling device 100 can receive the device information from the controlled devices 405 through 411. Hence, the controlling device 100 displays the peripheral recognition result in the display 403 of the controlling device 100. According to an embodiment of the present disclosure, the peripheral recognition result can be displayed using the icons 413 through 419 indicating the type of the controlled devices 405 through 411. For example, when the controlled devices 405 through 411 are speakers, the icons 413 through 419 indicating the controlled devices 405 through 411 can employ the speaker shape. For example, when the controlled devices 405 through 411 are lights, the icons 413 through 419 can employ the light shape.

According to an embodiment of the present disclosure, the icons 413 through 419 can be displayed in order of recognizing the corresponding controlled devices in the controlling device 100. For example, when the controlling device 100 recognizes the controlled devices 405 through 411 in order of the first controlled device 405, the second controlled device 407, the third controlled device 409, and the fourth controlled device 411, the controlling device 100 can sequentially display the first icon 413, the second icon 415, the third icon 417, and the fourth icon 419 corresponding to the recognition result in the recognition order.

According to another embodiment of the present disclosure, the icons 413 through 419 can be displayed in a different order from the order of recognizing the controlled devices 405 through 411. For example, regardless of the recognition order of the controlled devices 405 through 411, the controlling device 100 can display the icons 413 through 419 at the same time.

According to another embodiment of the present disclosure, the peripheral recognition result can be displayed in a different fashion from the icons 413 through 419. For example, the recognition result of the controlled devices 405 through 411 can be displayed in a list. That is, the peripheral recognition result can be displayed as the list arranging identification information of the controlled devices 405 through 411. For example, the identification information can include the ID and the SN. Hereafter, to ease the understanding, the icons 413 through 419 are displayed by way of example.

Referring to FIG. 4C, the controlling device 100 can automatically set the role of the controlled devices 405 through 411 without the user's command. For example, the controlling device 100 can obtain the correspondence between the locations of the controlled devices 405 through 411 and the locations of the role setting windows 421 through 427, and assign the roles to the controlled devices 405 through 411. For example, to recognize the locations of the controlled devices 405 through 411, the controlling device 100 can control the controlled devices 405 through 411 to output the identification signal. The identification signal is the signal agreed to be output from the controlled devices 405 through 411. The identification signal can be defined variously according to embodiments. For example, the identification signal can be defined as at least one of the light, the sound, and the image. Also, the same or different identification signals can be defined for the controlled devices. For example, the identification signal can be identified using at least one of the light color, the light pattern, the light cycle, the audio signal, the audio signal pattern, and the audio signal cycle.

The controlling device 100 can send the request message for requesting to output the identification signal, to the first controlled device 405. For example, the request message can notify the identification signal output request and include the information notifying at least one of the type, the content, and the display type (e.g., the duration time and the repetition count) of the identification signal.

For example, the controlling device 100 can display the icons 413 through 419 in the display 403 of the controlling device 100, and then control the first controlled device 405 to display a light signal, as the identification signal, through the display means of the first controlled device 405. In so doing, the controlling device 100 can detect the light signal through a sensor unit and obtain the location of the first controlled device 405. The sensor is a device for detecting an image signal or an audio signal. For example, the sensor can include a camera for detecting the image signal and a microphone for detecting the audio signal. The controlling device 100 can determine based on the light signal whether the location of the first controlled device 405 corresponds to the location of the first role setting window 421. When determining that the location of the first controlled device 405 is in the range of the first role setting window 421, the controlling device 100 can assign the role corresponding to the first role setting window 421, to the first controlled device 405.

For example, the controlling device 100 can control the controlled devices 405 through 411 to display the light signal in order of the first controlled device 405, the second controlled device 407, the third controlled device 409, and the fourth controlled device 411. When the controlled devices 405 through 411 display the light signal in order, the controlling device 100 can recognize the locations of the controlled devices 405 through 411 using the light signal. When the locations of the controlled devices 405 through 411 are in the range of the role setting windows 421 through 427 respectively, the controlling device 100 can assign the roles to the controlled devices 405 through 411 according to the locations of the role setting windows 421 through 427. For example, when the controlled devices 405 through 411 are speakers, the controlling device 100 can assign the front-left speaker role corresponding to the location of the first role setting window 421, to the first controlled device 405. Also, the controlling device 100 can assign the front-right speaker role corresponding to the location of the second role setting window 423, to the second controlled device 407, the back-left speaker role corresponding to the location of the third role setting window 325, to the third controlled device 409, and the back-right speaker role corresponding to the fourth role setting window 427, to the fourth controlled device 411.

While the controlling device 100 recognizes the controlled devices 405 through 411 and assigns the roles, the user cannot know which controlled devices the icons 413 through 419 correspond to respectively. Hence, the controlling device 100 can display the assigned roles in the display 403 so that the user can recognize the roles assigned to the controlled devices 405 through 411. For example, the controlling device 100 can move the icons 413 through 419 into the role setting windows 421 through 427 so that the user can recognize the correspondence between the icons 413 through 419 and the role setting windows 421 through 427.

When the user touches the icons 413 through 419, the controlled devices 405 through 411 perform the assigned role. For example, when the first controlled device 405 is a speaker, as the user touches the first icon 417, the first controlled device 405 outputs the audio according to the assigned role.

According to another embodiment of the present disclosure, when the user touches at least one of the icons 413 through 419 in the role setting windows 421 through 427, the controlling device 100 can display an interface for controlling the controlled device corresponding to the at least one icon in the display 403. For example, when the controlled device is a TV and the user touches the at least one icon, the controlling device 100 can display the interface for controlling the TV power activation/deactivation, the volume control, and the channel control in the display 403. The configuration of the interface for controlling the controlled device can vary according to the type of the controlled device. For example, when the controlled device is the air conditioner, the interface can include the configuration for controlling the temperature.

FIGS. 4A through 4C depict four controlled devices. However, according to another embodiment of the present disclosure, three or less or five or more controlled devices can be controlled by the controlling device. Also, FIGS. 4A through 4C depict four role setting windows. However, according to another embodiment of the present disclosure, three or less or five or more role setting windows can be present.

In FIGS. 4A through 4C, the controlled devices 405 through 411 are the speakers by way of example. However, according to another embodiment of the present disclosure, the type of the controlled devices 405 through 411 can vary. For example, the controlled devices 405 through 411 can be the lights or the multivisions. The multivision indicates the device for displaying a large screen by combining a plurality of display devices. The multivision includes a plurality of display devices including the display means, and its role varies according to the relatively location of each display device.

FIGS. 5A through 5C depict an electronic device for recognizing and controlling other electronic device according to yet another exemplary embodiment of the present disclosure.

FIGS. 5A through 5C depict that a controlling device 100 recognizes and controls a fourth controlled device 200-4 in a fourth space 507.

Referring FIG. 5A, in the range for sending and receiving signals to and from the fourth controlled device 200-4 in the fourth space 501 through distance measurement, the controlling device 501 can exchange the device information with the fourth controlled device 200-4. When a space including the spaces 501 through 507 is a house, the first space 501 can be a kitchen, the second space 503 can be a living room, the third space 505 can be a small bedroom, and the fourth space 507 can be a main bedroom.

Referring to FIG. 5B, the controlling device 100 displays the first icon 529 and role setting windows 521 through 527 according to the space in a display 519. The role setting windows 521 through 527 are interfaces for setting the role of the fourth controlled device 200-4 in association with the first icon 529.

The controlling device 100 displays the peripheral recognition result in the display 519 of the controlling device 100. According to an embodiment of the present disclosure, the peripheral recognition result can be displayed using the first icon 529 indicating the type of the fourth controlled device 200-4. For example, when the fourth controlled device 200-4 is a light, the first icon 529 indicating the fourth controlled device 200-4 can have the light shape. For example, when the fourth controlled device 200-4 is a speaker, the icons 313 through 319 can have the light shape.

According to another embodiment of the present disclosure, the peripheral recognition result can be displayed in a different fashion from the first icon 529. For example, the recognition result of the fourth controlled device 200-4 can be displayed in a list. That is, the peripheral recognition result can be displayed as the list arranging identification information of the fourth controlled device 200-4. For example, the identification information can include the ID and the SN. Hereafter, to ease the understanding, the first 200-4 is displayed by way of example.

Referring to FIG. 5C, the user can assign the role to the fourth controlled device 529 through the role setting windows 521 through 527.

For example, when the user touches and drags the first icon 529 displayed in the display 519 of the controlling device 100 and drops it into the fourth role setting window 527, the fourth controlled device corresponding to the first icon 529 is set to serve the role corresponding to the fourth role setting window 527. For example, when the fourth space is the main room and the fourth controlled device is the light, the user can assign a main room light role in the fourth role setting window 527. In so doing, when the user drags and moves the first icon 529 into the fourth role setting window 527, the fourth controlled device is set to perform the main room light role corresponding to the fourth role setting window 527.

When the user touches the first icon 529 moved into the fourth role setting window, the fourth controlled device 200-4 performs the role corresponding to the role of the fourth role setting window 527. For example, when the fourth controlled device 200-4 is the light, as the user touches the first icon 529, the fourth controlled device 200-4 outputs the light according to the assigned role.

According to another embodiment of the present disclosure, when the user touches the first icon 529 in the fourth role setting window 527, the controlling device 100 can display an interface for controlling the fourth controlled device 200-4 in the display 519. For example, when the fourth controlled device 200-4 is the light and the user touches the first icon 529, the controlling device 100 can display the interface for controlling the light brightness and the power activation/deactivation of the light, in the display 519. The configuration of the interface can vary according to the type of the controlled device. For example, when the controlled device is the air conditioner, the interface can include the configuration for controlling the temperature.

In FIGS. 5A through 5C, the controlling device recognizes and controls one controlled device placed in one of the four spaces. However, according to another embodiment of the present disclosure, three or less or five or more spaces can be present and one or more controlled devices can be placed in each space. Also, as moving in at least one space, the controlling device can recognize and control one or more controlled devices.

FIGS. 6A through 6C depict an electronic device for recognizing and controlling other electronic device according to still another exemplary embodiment of the present disclosure.

In FIGS. 6A through 6C, when a location information providing device is present in a place where the space is divided, the controlling device automatically recognizes and configures the controlled device.

Referring to FIG. 6A, when the space including the spaces 601 through 607 is a house, the first space 601 can be a kitchen, the second space 603 can be a living room, the third space 605 can be a small bedroom, and the fourth space 607 can be a main bedroom.

FIG. 6A depicts location information providing devices 617 through 623 for providing location information of the spaces 601 through 607 placed in the spaces 601 through 607 according to an embodiment of the present disclosure.

The location information providing devices 617 through 623 store the location information of the spaces 601 through 607. The location information providing devices 617 through 623 can send the location information to at least one electronic device having the communication functionality in a signal transmission range of the location information providing devices 617 through 623.

For example, the location information can include identification information of the rooms where the location information providing devices 617 through 623 are installed. Details of the identification information can vary according to various embodiments of the present disclosure. For example, the identification information can include one of a name such as main bedroom, kitchen, and living room, and an ID combining characters and numbers. For example, the first location information providing device 617 in the first space 601 can provide the location information of the first space 601 to an electronic device placed in the first space 601. Likewise, the second through fourth location information providing devices 619 through 623 in the second through fourth spaces 603 through 607 can provide electronic devices placed in the second through fourth spaces with their respective location information.

For example, when the controlling device 100 is placed in the fourth space 607, the controlling device 100 can receive the location information from the fourth location information providing device 623 in a range for recognizing the location information sent from the fourth location information providing device 623. The controlling device 100 can recognize that the controlling device 100 is placed in the fourth space 607 based on the location information received from the fourth location information providing device 623.

In FIG. 6B, the controlling device 100 recognizes the fourth controlled device 200-4 in the fourth space 607, receives device information from the fourth controlled device 200-4, and receives the location information from the fourth location information providing device 623.

The controlling device 100 displays the first icon 637 and role setting windows 629 through 635 based on the space in a display 627. The role setting windows 629 through 635 are interfaces for setting the role of at least one controlled device in association with the at least one icon.

The controlling device 100 displays a peripheral recognition result in the display 627 of the controlling device 100. According to an embodiment of the present disclosure, the peripheral recognition result can be displayed using the first icon 637 indicating the type of the fourth controlled device 200-4. For example, when the fourth controlled device 200-4 is the light, the first icon 637 can employ a light shape indicating the fourth controlled device 200-4. For example, when the fourth controlled device 200-4 is the speaker, the first icon 637 can employ a speaker shape.

According to another embodiment of the present disclosure, the peripheral recognition result can be displayed in a different fashion from the first icon 637. For example, the recognition result of the fourth controlled device 200-4 can be displayed in a list. That is, the peripheral recognition result can be displayed as the list arranging identification information of the fourth controlled device 200-4. For example, the identification information can include the ID and the SN. Hereafter, to ease the understanding, the first icon 637 is displayed by way of example.

Referring to FIG. 6C, the controlling device 100 can automatically set the role of the fourth controlled device 200-4 without the user's command. For example, the controlling device 200-4 recognizes that the fourth controlled device 100 is placed in the fourth space 607 based on the location information received from the fourth location information providing device 623 and the device information received the fourth controlled device 200-4. When dragging and moving the first icon 637 into the fourth role setting window 635, the controlling device 100 can assign the role corresponding to the fourth space 607 to the fourth controlled device 200-4. For example, when the fourth space 607 is the main bedroom and the fourth controlled device 200-4 is the light, the main room light role can be assigned to the fourth controlled device 200-4. At this time, when the user touches the first icon 637 moved into the fourth role setting window 635, the fourth controlled device 200-4 performs the role corresponding to the role of the fourth role setting window 635. For example, when the fourth controlled device 200-4 is the speaker, as the user touches the first icon 635, the fourth controlled device 200-4 outputs the audio according to the assigned role.

According to another embodiment of the present disclosure, when the user touches the first icon 637 in the fourth role setting window 635, the controlling device 100 can display an interface for controlling the fourth controlled device 200-4 in the display 627. For example, when the fourth controlled device 200-4 is the light and the user touches the first icon 637, the controlling device 100 can display the interface for controlling the light brightness and the activation/deactivation of the light power, in the display 627. The configuration of the interface can vary according to the type of the controlled device. For example, when the controlled device is the air conditioner, the interface can include the configuration for controlling the temperature.

FIGS. 6A through 6C depict the controlling device for recognizing and controlling one controlled device placed in one of the four spaces. However, according to another embodiment of the present disclosure, three or less or five or more spaces can be present and one or more controlled devices can be placed in each space. Also, as moving in at least one space, the controlling device can recognize and control one or more controlled devices.

FIGS. 7A and 7B depict grouping with the other electronic device in the electronic device according to an exemplary embodiment of the present disclosure.

In FIG. 7A, a first electronic device 701 through a fourth electronic device 707 are grouped to a first group 713, and a fifth electronic device 709 and a sixth electronic device 711 are grouped to a second group 715. The first electronic device 701 through the sixth electronic device 711 can be the controlling devices or the controlled devices.

The electronic devices 701 through 711 can form one group with electronic devices in a short distance by measuring distances between the electronic devices 701 through 711. The distance can be measured using the RSSI or the audio time stamp between the electronic devices. For example, the electronic devices 701 through 711 can obtain the adjacent distance of the electronic devices by checking the RSSI or the audio time stamp between the electronic devices 701 through 711, and thus the adjacent electronic devices can form the respective groups. For example, the first electronic device 701 through the fourth electronic device 707 form the first group 713. Also, the fifth electronic device 709 and the sixth electronic device 711 form the second group 715.

The electronic devices 701 through 711 are assigned the roles suitable for their group. For example, when the first electronic device 701 is a refrigerator and the second electronic device 703 through the fourth electronic device 707 are speakers including radio functionality, the second electronic device 703 through the fourth electronic device 707 recognize that the first electronic device 701 is the refrigerator by exchanging the device information with the first electronic device 701. Based on the device information, the second electronic device 703 through the fourth electronic device 707 can confirm that the place where the refrigerator is placed is the kitchen. The second electronic device 703 through the fourth electronic device 707 can function as the speakers in the kitchen according the positioning result. For example, when the role of the speaker in the kitchen is to play the radio, the second electronic device 703 through the fourth electronic device 707 can play the radio.

For example, when the fifth electronic device 709 is a TV and the sixth electronic device 711 is a speaker, the sixth electronic device 711 can receive the device information of the fifth electronic device 709 and thus play the sound of the TV.

Referring to FIG. 7B, when the user moves the fourth electronic device 707 out of the grouping distance of the first group 713 into the grouping distance range of the second group 715 in operation 717 and the fourth electronic device 707 determines that it cannot send and receive signals to and from the first electronic device 701 through the third electronic device 705 of the first group 713, the fourth electronic device 707 terminates the grouping with the first electronic device 701 through the third electronic device 705. The fourth electronic device 707 measures the distances to the fifth electronic device 709 and the sixth electronic device 711 of the second group 715. In the range for sending and receiving signals according to the distance measurement, the fourth electronic device 707 through the sixth electronic device 711 exchange the device information and regroup the second group 715. Also, the fourth electronic device 707 can be assigned a new role according to the electronic devices of the new group. For example, when the first electronic device 701 is a refrigerator, the fifth electronic device 709 is a PC, the role of the fourth electronic device 707 is to play the radio in the first group 713, and, after moving to the second group 715, the user of the fourth electronic device 711 moves the fourth electronic device 707 to an area of the second group 715 including the fifth electronic device 709, the fourth electronic device 707 can function as the PC speaker by exchanging the device information with the fifth electronic device 709.

According to another embodiment of the present disclosure, when the fourth electronic device 707 moves within an area of the first group 713, the fourth electronic device 707 can retain the first group 713. According to another embodiment of the present disclosure, the above-stated construction can vary.

FIG. 8 depicts the electronic device associated with a wearable device according to an exemplary embodiment of the present disclosure.

In FIG. 8, a user 801 wears a wearable device 803 and moves the electronic device 805.

The wearable device 803 indicates a device worn by the user 801 and having the functionality for sending and receiving signals to and from the electronic device 805. For example, the wearable device 803 can include a glass-type terminal, a wristwatch-type terminal, and an earring and a bracelet having the communication functionality. The wearable device 803 can receive information about the user 801 from the user 801. For example, the wearable device 803 can receive the information about the user 801 such as place mainly located, favorite TV program, favorite radio program, wakeup time, and bedtime.

The electronic device 805 is a device having the communication functionality and displaying at least one signal of image information and audio information. For example, the electronic device 805 can include a speaker, a light, a washing machine, a refrigerator, a TV, an audio, a game console, a PC, an automatic curtain, an oven, a robot cleaner, an air conditioner, a dishwasher, and a CCTV. The electronic device 805 can measure the distance 807 to the wearable device 803 and measure the time for keeping a certain distance between the wearable device 803 and the electronic device 805. The distance can be measured using the RSSI or the audio time stamp between the electronic device 805 and the wearable device 803.

For example, when the user 801 wears the wearable device 803 and moves around carrying the electronic device 805, the electronic device 805 measures whether the distance to the wearable device 803 is in a certain range. When determining the distance in the certain range, the electronic device 805 measures the time for keeping the distance of the wearable device 803 and the electronic device 805 in the certain range. When exceeding a preset time, the electronic device 805 determines that the electronic device 805 is moving. The electronic device 805 continuously measures the distance to the wearable device 803. When the distance exceeds a certain range, the electronic device 805 determines that the movement is finished. The electronic device 805 can perform a new role based on user information received through the wearable device 803 and device information received from adjacent electronic devices after the movement. For example, it is provided that the electronic device 805 is the speaker and the user 801 prefers a particular sound volume and inputs information of a particular bedtime in the wearable device 803. When the user 801 wears the wearable device 803 and moves the electronic device 805 to the living room where the TV is placed, the electronic device 805 functions as the speaker of the TV based on the user information received from the wearable device 803 and the device information received from the TV. In so doing, the electronic device 805 can be configured to play the particular sound volume preferred by the user 801 and to end the playback at the particular time.

FIG. 9 depicts service topology with other electronic devices in the electronic device according to an exemplary embodiment of the present disclosure.

In FIG. 9, the service topology is set between a controlling device 100 and controlled devices 200-1 through 200-4, and the existing service topology is maintained between the controlling device 100 and the fourth controlled device 200-4 when the first controlled device 200-1 through the third controlled device 200-3 and the controlling device 100 deunit a controllable range.

Referring to FIG. 9, when the controlling device 100 and the controlled devices 200-1 through 200-4 move in a range for recognizing each other, the controlling device 100 and the controlled devices 200-1 through 200-4 retain the existing service topology. Also, in the service topology of the controlling device 100 and the controlled devices 200-1 through 200-4, when the first controlled device 200-1 through the third controlled device 200-3 leaves the mutual recognition range of the controlling device 100 and the fourth controlled device 200-4, the controlling device 100 and the fourth controlled device 200-4 retain the existing service topology.

FIG. 10 depicts service topology with other electronic devices in the electronic device according to another exemplary embodiment of the present disclosure.

In FIG. 10, the service topology is set between a controlling device 100 and the controlled devices 200-1 through 200-4, and new service topology, rather than the existing service topology, is established between the controlling device 100 and the fourth controlled device 100 when the first controlled device 200-1 through the third controlled device 200-3 and the controlling device 100 leave the communication range of the controlling device 100 and the fourth controlled device 200-4.

For example, when the first controlled device 200-1 serves as an Access Point (AP) and interconnects the controlling device 100 with the second controlled device 200-2 through the fourth controlled device 200-4, and the controlling device 100 and the first controlled device 200-1 through the fourth controlled device 200-4 move within the range for recognizing mutual signals, the controlling device 100 and the controlled devices 200-1 through 200-4 retain the existing service topology. However, in the service topology between the controlling device 100 and the first controlled device 200-1 through the fourth controlled device 200-4, when the first controlled device 200-1 through the third controlled device 200-3 leave the mutual signal recognition range of the controlling device 100 and the fourth controlled device 200-4, the controlling device 100 and the fourth controlled device 100 retain the connection by switching to a new service topology, rather than the existing service topology.

FIG. 11 is a flowchart of a method for recognizing and configuring the other electronic device in the electronic device according to an exemplary embodiment of the present disclosure.

Hereafter, the electronic device can correspond to the controlling device of FIG. 2, and the other electronic device can correspond to one of the controlled devices of FIG. 2.

Referring to FIG. 11, the electronic device scans the other electronic device in operation 1101. The electronic device scans a signal of at least one other electronic device. In other words, the electronic device determines whether the at least one other electronic device is located at the controllable distance. The controllable distance can be determined by measuring the distance using the RSSI or the audio time stamp between the electronic device and the at least one other electronic device. The electronic device and the at least one other electronic device can exchange their device information. The device information includes the connectivity information, the service information, the device unique ID information, the device type information, and the device name. The electronic device can recognize the at least one other electronic device based on the device information sent from the at least one other electronic device.

In operation 1103, the electronic device displays the recognition result of the other electronic device. The electronic device displays the recognition result of the at least one other electronic device. The displaying can be displayed using at least one icon or list.

In operation 1105, the electronic device sends the message requesting to output the identification signal, to the at least one other electronic device. That is, the electronic device can send the message requesting the at least one other electronic device to output the identification signal so that the user can recognize the correspondence between the at least one other electronic device and the recognition result display. The identification signal is the signal agreed to be output from the at least one other electronic device. The identification signal can be defined variously according to embodiments.

In operation 1107, the electronic device assigns the role of the at least one other electronic device. The electronic device displays at least one recognition result display and at least one role setting window. Through the at least one role setting window, the user can assign the role to the at least one other electronic device. For example, when the at least one recognition result is displayed as the at least one icon and the user touches, drags, and drops the at least one icon displayed in the display of the electronic device into the at least one role setting window, the at least one other electronic device corresponding to the at least one icon is set to serve the role corresponding to the at least one role setting window. When the user touches the at least one icon in the at least one role setting window, the at least one other electronic device performs the role corresponding to the role of the at least one role setting window.

According to another embodiment of the present disclosure, the electronic device can display an interface for controlling the at least one other electronic device in the display of the electronic device. For example, when the other electronic device is the audio system and the user touches the at least one icon in the at least one role setting window, the electronic device can display an interface for controlling the audio system such as activation/deactivation of the audio system power, volume control, and channel control, in the display of the electronic device. The configuration of the interface for controlling the controlled device can vary according to the type of the other electronic device. For example, when the other electronic device is the air conditioner, the interface can include the configuration for controlling the temperature.

FIG. 12 is a flowchart of a method for recognizing and configuring the other electronic device in the electronic device according to another exemplary embodiment of the present disclosure.

Hereafter, the electronic device can correspond to the controlling device of FIG. 2, and the other electronic device can correspond to one of the controlled devices of FIG. 2.

Referring to FIG. 12, the electronic device scans at least one other electronic device in operation 1201. The electronic device scans a signal of the at least one other electronic device. The electronic device can determine whether the at least one other electronic device is located at the controllable distance. The electronic device can determine the controllable distance location using the RSSI or the audio time stamp between the electronic device and the at least one other electronic device. The electronic device can exchange the device information with the at least one other electronic device. The device information includes the connectivity information, the service information, the device unique ID information, the device type information, and the device name. The electronic device can recognize the at least one other electronic device based on the device information sent from the at least one other electronic device.

In operation 1203, the electronic device displays the recognition result of the at least one other electronic device. The electronic device recognizes the at least one other electronic device and receives the device information from the at least one other electronic device. Hence, the electronic device can display the recognition result of the at least one other electronic device. The recognition result display which is the display of the recognition result can be displayed using at least one icon or list.

In operation 1205, the electronic device sends the message requesting to output the identification signal, to the at least one other electronic device. The electronic device can control the at least one other electronic device to output the identification signal so as to recognize the location of the at least one other electronic device. The identification signal is the signal agreed to be output from the at least one other electronic device. The identification signal can be defined variously according to embodiments. For example, the identification signal can be defined as at least one of the light, the sound, and the image. Also, the same or different identification signals can be defined for the at least one other electronic device. For example, the identification signal can be identified using at least one of the light color, the light pattern, the light cycle, the audio signal, the audio signal pattern, and the audio signal cycle.

In operation 1207, the electronic device recognizes the identification signal of the other electronic device. The electronic device can recognize the identification signal which is output from the at least one other electronic device through the sensor, and obtain the location of the at least one other electronic device. The sensor is the device for detecting the image signal or the audio signal. For example, the sensor can include the camera for detecting the image signal and the microphone for detecting the audio signal.

In operation 1209, the electronic device assigns the role of the at least one other electronic device. When determining that the location of the at least one other electronic device is in the range of at least one role setting window based on the identification signal of the at least one other electronic device, the electronic device can control to assign the role corresponding to the role setting window to the at least one other electronic device.

For example, referring to FIG. 4C, when determining that the first controlled device through the fourth controlled device are in the range of the first role setting window through the fourth role setting window respectively, the electronic device can assign the roles according to the locations of the first role setting window through the fourth role setting window, to the first controlled device through the fourth controlled device respectively. Also, the electronic device moves the icons corresponding to the recognition result of the controlled devices to the respective role setting windows so that the user can intuitively recognize the correspondence between the controlled devices and the role setting windows.

According to another embodiment of the present disclosure, the method of the electronic device for assigning the role of the other electronic device can vary. For example, referring to FIG. 6A, at least one location information providing device for providing the location information of at least one space can be present in the at least one space. The at least one location information providing device can send the location information to at least one electronic device having the communication functionality within the signal transmission range of the at least one location information providing device.

For example, referring to FIG. 6C, when the at least one location information providing device is in the fourth space, the electronic device can recognize that the electronic device is in the fourth space based on the location information received from the at least one location information providing device. Also, the electronic device can recognize that at least one other electronic device recognized in the fourth space is present in the fourth space. Thus, the electronic device can confirm the location of the at least one other electronic device and its location in the fourth space, and assign the role to the at least one other electronic device. For example, the electronic device can configure the at least one other electronic device to perform the role according to the fourth space, based on the location information of the fourth space received from the fourth location information providing device and the device information received from the at least one other electronic device. In so doing, the electronic device can drag and move at least one recognition result display which is the result of recognizing the at least one other electronic device, into the fourth role setting window so that the user can visually recognize whether the role of the at least one other electronic device is assigned. For example, when the at least one recognition result display is displayed as the icon, the electronic device can drag and move the icon into the fourth role setting window so that the user can visually recognize the role assignment of the at least one other electronic device.

According to another embodiment of the present disclosure, the electronic device can display the interface for controlling the at least one other electronic device in the display of the electronic device. For example, when the other electronic device is the audio system and the user touches the at least one icon in the at least one role setting window, the electronic device can display the interface for controlling the audio system such as activation/deactivation of the audio system power, volume control, and channel control, in the display of the electronic device. The configuration of the interface can vary according to the type of the other electronic device. For example, when the other electronic device is the air conditioner, the interface can include the configuration for controlling the temperature.

FIG. 13 is a flowchart of operations of the other electronic device according to an exemplary embodiment of the present disclosure.

Hereafter, the electronic device can correspond to the controlling device of FIG. 2, and the other electronic device can correspond to one of the controlled devices of FIG. 2.

Referring to FIG. 13, the other electronic device scans at least one electronic device in operation 1301. The other electronic device scans a signal of the at least one electronic device. The other electronic device can determine whether the at least one electronic device is located at the controllable distance. The other electronic device can determine the distance to the at least one electronic device through the RSSI or the audio time stamp between the other electronic device and the at least one electronic device. When the distance allows the signal transmission and reception, the other electronic device can exchange the device information with the at least one electronic device.

The other electronic device receives the identification signal output request message in operation 1303. The other electronic device can receive the request message requesting to output the identification signal from the at least one electronic device. The request message can notify the output request of the identification signal and include the information notifying at least one of the type, the content, and the display type (e.g., the duration time and the repetition count) of the identification signal.

In operation 1305, the other electronic device outputs the identification signal. The identification signal is the signal agreed to be output from the other electronic device. The identification signal can be defined variously according to embodiments. For example, the identification signal can be defined as at least one of the light, the sound, and the image. Also, the same or different identification signals can be defined for the controlled devices. For example, the identification signal can be identified using at least one of the light color, the light pattern, the light cycle, the audio signal, the audio signal pattern, and the audio signal cycle.

In operation 1307, the other electronic device is assigned the role of the other electronic device. The other electronic device can be controlled to be assigned the role from at least one electronic device. For example, when the other electronic device is the speaker, the other electronic device can be assigned the role of the speaker according to the location of the other electronic device.

According to another embodiment of the present disclosure, the other electronic device can be controlled by the at least one electronic device. For example, when the other electronic device is the audio system, the other electronic device can control the power activation/deactivation, the volume, and the channel of the other electronic device according to the command of the at least one electronic device. For example, when the other electronic device is the light, the other electronic device can control the brightness of the light of the other electronic device according to the control signal of the at least one electronic device.

FIG. 14 is a flowchart of a method for grouping the other electronic device in the electronic device according to an exemplary embodiment of the present disclosure.

Hereafter, the electronic device can correspond to the controlling device of FIG. 2, and the other electronic device can correspond to one of the controlled devices of FIG. 2.

Referring to FIG. 14, the electronic device scans at least one other electronic device in operation 1401. The electronic device scans the signal of the at least one other electronic device. That is, the electronic device can determine whether the at least one other electronic device is located at the controllable distance. The electronic device can determine whether the at least one other electronic device is located at the distance for sending and receiving the signals, using the RSSI or the audio time stamp of the at least one other electronic device. When the at least one other electronic device is located at the distance for sending and receiving the signals, the electronic device can exchange the device information with the at least one other electronic device. The device information includes the connectivity information, the service information, the device unique ID information, the device type information, and the device name. The electronic device can recognize the at least one other electronic device based on the device information sent from the at least one other electronic device.

In operation 1403, the electronic device groups with the other electronic device. The electronic device can form one group with at least one other electronic device in proximity through the distance measurement with the at least one other electronic device. The distance can be measured using the RSSI or the audio time stamp between the electronic devices. For example, referring to FIG. 7A, the first electronic device through the fourth electronic device can be set to the first group, and the fifth electronic device and the sixth electronic device can be set to the second group through the mutual distance measurement.

Figure 15:
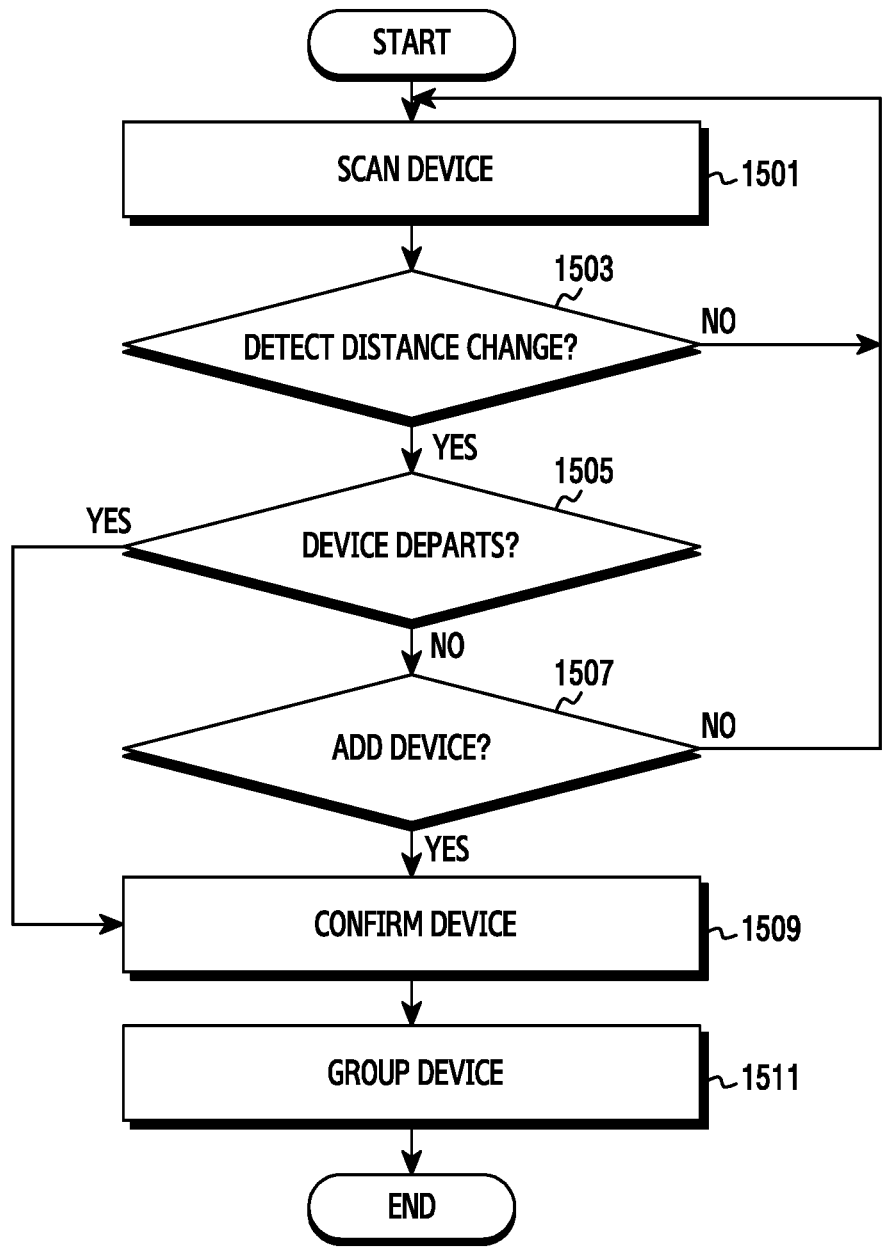
FIG. 15 illustrates a flow chart for regrouping the other electronic device in the electronic device according to an exemplary embodiment of the present disclosure.

FIG. 15 illustrates a method for regrouping with the other electronic device in the electronic device according to an exemplary embodiment of the present disclosure.

Hereafter, the electronic device can correspond to the controlling device of FIG. 2, and the other electronic device can correspond to one of the controlled devices of FIG. 2.

Referring to FIG. 15, the electronic device scans at least one other electronic device in operation 1501. The electronic device can scan the at least one other electronic device using the RSSI or the audio time stamp. When determining that the at least one other electronic device is adjacent, the electronic device can form the group with the at least one other electronic device.

In operation 1503, the electronic device detects the distance change of at least one other electronic device and the electronic device. The electronic device can confirm the adjacent distance by checking the RSSI or the audio time stamp of the at least one other electronic device.

In operation 1505, the electronic device determines whether at least one other electronic device of the group leaves the group. The electronic device can determine whether the electronic device and the at least one other electronic device leave the group using the RSSI or the audio time stamp of the at least one other electronic device.

In operation 1507, the electronic device determines whether at least one other electronic device is added to the group. When detecting a signal of at least one other electronic device through the RSSI or the audio time stamp, the electronic device can determine that the at least one other electronic device is added.

In operation 1509, the electronic device confirms information about the other electronic device departed or added. For example, with respect to at least one other electronic device departed, the electronic device can determine which electronic device leaves the group based on the pre-acquired device information of the at least one other electronic device departed. Also, the electronic device can obtain the information of the at least one other electronic device added by exchanging the device information with the other electronic device added. The device information includes the connectivity information, the service information, the device unique ID information, the device type information, and the device name.

In operation 1511, the electronic device groups with at least one other electronic device. When the at least one other electronic device departs, the electronic device can perform the grouping excluding the at least one other electronic device. When the at least one other electronic device is added, the electronic device can perform the grouping including the at least one other electronic device.

FIG. 16 depicts a method for configuring the service topology with the other electronic device in the electronic device according to an exemplary embodiment of the present disclosure.

Hereafter, the electronic device can correspond to the controlling device of FIG. 2, and the other electronic device can correspond to one of the controlled devices of FIG. 2.

Referring to FIG. 16, the electronic device scans at least one other electronic device in operation 1601. The electronic device determines the distance to other electronic device in the group by scanning the at least one other electronic device. The distance between the controlling device and the controlled devices can be obtained using the RSSI or the audio time stamp between the controlling device and the controlled devices.

In operation 1603, the electronic device determines whether other electronic device in the group moves. Referring to FIG. 7B, when not sending and receiving signals to and from the fourth electronic device, the first electronic device through the third electronic device of the first group determine that the fourth electronic device departs the first group. Also, when the fourth electronic device enters the second group and sends and receives signals, the fifth electronic device and the sixth electronic device of the second group determine that the fourth electronic device is added to the second group.

In operation 1605, the electronic device determines whether to change the service topology with the other electronic device. The electronic device determines whether to retain the existing service topology with the other electronic device or to connect to each other using a new service topology, rather than the existing service topology. For example, referring to FIG. 10, when the first controlled device serves as the AP and interconnects the controlling device with the second controlled device through the fourth controlled device and the controlling device and the first controlled device through the fourth controlled device move within the range for recognizing mutual signals, the controlling device and the first controlled device through the fourth controlled device retain the existing service topology. However, in the connection between the controlling device and the first controlled device through the fourth controlled device, when the first controlled device through the third controlled device leave the mutual signal recognition range of the controlling device and the fourth controlled device, the controlling device and the fourth controlled device switch to the new service topology, rather than the existing service topology.

In operation 1607, the electronic device changes the service topology with the other electronic device. When determining that the existing service topology with the at least one other electronic device is no longer available, the electronic device switches to the new service topology, rather than the existing service topology, and thus retain the connection to the at least one other electronic device. For example, referring to FIG. 10, in the connection between the controlling device and the first controlled device through the fourth controlled device, when the first controlled device through the third controlled device leave the mutual signal recognition range of the controlling device and the fourth controlled device, the controlling device and the fourth controlled device retain the mutual connection by switching to the new service topology, rather than the existing service topology.

FIG. 17 is a flowchart of a method for grouping with the other electronic device in the electronic device according to another exemplary embodiment of the present disclosure.

Hereafter, the electronic device can correspond to the controlling device of FIG. 2, and the other electronic device can correspond to one of the controlled devices of FIG. 2.

Referring to FIG. 17, the electronic device scans at least one other electronic device in operation 1701. The electronic device can determine whether the at least one other electronic device is located at the distance for sending and receiving the signals using the RSSI or the audio time stamp of the at least one other electronic device. When the at least one other electronic device is located at the distance for sending and receiving the signals, the electronic device can exchange the device information with the at least one other electronic device. The device information includes the connectivity information, the service information, the device unique ID information, the device type information, and the device name. The electronic device can recognize the at least one other electronic device based on the device information sent from the at least one other electronic device.

In operation 1603, the electronic device determines whether the at least one other electronic device is the wearable device. The wearable device indicates the device worn by the user and having the functionality for sending and receiving signals to and from the electronic device. The wearable device can receive the user information such as place mainly located, favorite TV program, favorite radio program, wakeup time, and bedtime, from the user. The electronic device recognizes that the wearable device is the wearable device by exchanging the device information with the wearable device.

In operation 1705, the electronic device determines whether the distance to the wearable device is maintained. For example, when the user wears the wearable device and moves around carrying the electronic device, the electronic device measures whether the distance to the wearable device is in a certain range. When determining that the distance in the certain distance, the electronic device measures the time for keeping the distance of the wearable device and the electronic device in the certain range, and determines that the electronic device is moving when the time exceeds a preset time. The electronic device continuously measures the distance to the wearable device, and determines that the movement is finished when the distance exceeds the certain range.

In operation 1707, the electronic device groups with another electronic device. The electronic device performs the new role based on the user information received through the wearable device and the device information received from the adjacent electronic devices after the movement. For example, when the electronic device is the speaker and the user prefers a particular volume in the wearable device, outputs information about a particular bedtime, puts on the wearable device, and moves the electronic device to the living room where the TV is placed, the electronic device serves as the TV speaker role based on the user information received through the wearable device and the device information received from the TV. In so doing, the electronic device can be configured to play at the particular volume preferred by the user and to end the play at the particular time.

FIG. 18 is a flowchart of operations of the electronic device according to an exemplary embodiment of the present disclosure.

Hereafter, the electronic device can correspond to the controlling device of FIG. 2, and the other electronic device can correspond to one of the controlled devices of FIG. 2.

Referring to FIG. 18, the electronic device displays the result of recognizing at least one other electronic device in operation 1801. The electronic device outputs the recognition result display which is the result of recognizing at least one other electronic device, to a screen display unit of the electronic device. The recognition result display can be displayed using at least one icon or list.

In operation 1803, the electronic device sends the device identification signal output request message to at least one other electronic device. The electronic device sends the device identification signal output request message to the at least one other electronic device through a communication unit of the electronic device.

FIG. 19 is a flowchart of operations of the other electronic device controlled by the electronic device according to an exemplary embodiment of the present disclosure.

Hereafter, the electronic device can correspond to the controlling device of FIG. 2, and the other electronic device can correspond to one of the controlled devices of FIG. 2.

Referring to FIG. 19, the other electronic device receives the device identification signal output request message from at least one electronic device. The other electronic device receives the device identification signal output request message from the at least one electronic device through a communication unit of the other electronic device.

The other electronic device outputs the device identification signal. The other electronic device outputs the device identification signal through a display unit of the other electronic device. The device identification signal can include at least one of the number, the character, the image, the light color, the light pattern, the light cycle, the audio signal pattern, and the audio signal cycle, to distinguish from another electronic device.

FIG. 20 is a block diagram of the controlling device according to an exemplary embodiment of the present disclosure.

Referring to FIG. 20, a controlling device 100 includes a communication unit 2001, a sensor unit 2003, a screen display/input unit 2005, a memory unit 2007, and a control unit 2009.

The communication unit 2001 processes to send and receive radio signals of input and output data through an antenna (not shown). For example, for the transmission, the communication unit 2001 channel-codes, spreads, Radio Frequency (RF) processes, and sends data to transmit. For the reception, the communication unit 2001 converts a received RF signal to a baseband signal and restores the data by de-spreading and channel decoding the baseband signal. In addition to the typical functions, according to an embodiment of the present disclosure, the communication unit 2001 can send the message requesting the at least one other controlled device to output the identifiable signal. The communication unit 2001 can include a first communication module for sending and receiving signals for recognizing the at least one controlled device, and a second communication module for sending and receiving data signals to and from the at least one other electronic device recognized.

The sensor unit 2003 can be implemented by combining one or two or more of a Global Positioning System (GPS) receiver, a gyro sensor, a geomagnetic sensor, a gravity sensor, an NFC sensor, a photo sensor, and an audio sensor. According to an embodiment of the present disclosure, the sensor unit 2003 includes a camera unit for detecting movement of the light, and a microphone for detecting the audio signal. The camera unit includes a camera sensor for converting an optical signal detected in the image capturing to an electric signal, and a signal processor for converting an analog image signal captured from the camera sensor to digital image data. Herein, the camera sensor can be implemented using a Charge coupled Device (CCD) sensor, and the signal processor can be implemented using a Digital Signal Processor (DSP). In addition to the typical function, according to an embodiment of the present disclosure, the sensor unit 2003 can include a camera or a microphone for recognizing the identifiable signal including at least one of the number, the character, the image, the light color, the light pattern, the light cycle, the audio signal pattern, and the audio signal cycle.

The screen display/input unit 2005 provides an input/output interface between the electronic device and the user. That is, the screen display/input unit 2005 provides an interface for user's touch input/output. In more detail, the screen display/input unit 2005 is a medium for sending the user's touch input to the electronic device and showing the output from the electronic device to the user. Also, the screen display/input unit 2005 provides a visual output to the user. For example, the screen display/input unit 2005 outputs an image of the device recognized by the camera of the electronic device. Such a visual output can be represented in the form of text, graphic, video, or their combination. The screen display/input unit 2005 can employ various display technologies. For example, the screen display/input unit 2005 can employ a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED). The screen display/input unit 2005 of the present disclosure is not limited to a touch screen using those display technologies. Also, the screen display/input unit 2005 can be divided into the screen display unit and the input unit. In addition to the typical function, according to an embodiment of the present disclosure, the screen display/input unit 2005 can display the result of recognizing at least one controlled device as at least one item. The screen display/input unit 2005 can display at least one window for displaying the role of at least one controlled device. The screen display/input unit 2005 can display an item corresponding to the controlled device which outputs the identifiable signal among the at least one controlled device, to be distinguished from at least one other item. When the user selects the at least one item displayed in the at least one window, the screen display/input unit 2005 can display the interface for controlling the controlled device corresponding to the at least one item. The screen display/input unit 2005 can display the window corresponding to the location of at least one controlled device which outputs the identification signal. The screen display/input unit 2005 can display the item corresponding to at least one controlled device which outputs the identification signal, in the at least one window.

The memory unit 2007 stores microcode and various reference data of a program for the processing and the controlling of the controller 2009. According to an embodiment of the present disclosure, the memory unit 2007 stores a program and various information for recognizing and managing at least one controlled device.

The control unit 2009 controls overall operation of the controlling device. For example, the control unit 2009 processes and controls voice communication and data communication. In addition to the typical function, according to an embodiment of the present disclosure, when the at least one item is displayed in the at least one window according to the user's command, the control unit 2009 can control to assign the role to the controlled device corresponding to the at least one item. When the user selects the at least one item displayed in the at least one window, the control unit 2009 can control the controlled device corresponding to the at least one item to perform the assigned role. The control unit 2009 can control the at least one other electronic device to serve the role according to the location. The control unit 2009 can control to assign the role to the at least one controlled device according to the location information and control the at least one controlled device to serve the assigned role.

FIG. 21 is a block diagram of the controlled device according to an exemplary embodiment of the present disclosure.

Referring to FIG. 21, a controlled unit 200 includes a communication unit 2101, an output unit 2103, a memory unit 2105, and a control unit 2107.

The communication unit 2101 processes to send and receive radio signals of input and output data through an antenna (not shown). For example, for the transmission, the communication unit 2101 channel-codes, spreads, RF-processes, and sends data to transmit. For the reception, the communication unit 2101 converts a received RF signal to a baseband signal and restores the data by de-spreading and channel decoding the baseband signal. In addition to the typical functions, according to an embodiment of the present disclosure, the communication unit 2101 can receive the message requesting to output the identifiable signal from the controlling device. The communication unit 2101 can send and receive the signal for recognizing at least one other controlled device and data to and from the at least one other controlled device. The communication unit 2101 can include a first communication module for sending and receiving the signals for recognizing the at least one other controlled device, and a second communication module for sending and receiving data signals to and from the at least one other controlled device. The communication unit 2101 can send and receive the signals for recognizing at least one wearable device containing the user information and wearable by the user. The communication unit 2101 can receive the message requesting to output the identifiable signal from the controlling device.

The output unit 2103 can include a display unit for outputting the light signal, and a speaker for outputting the audio signal. According to an embodiment of the present disclosure, the output unit 2103 can output the identifiable signal including at least one of the number, the character, the image, the light color, the light pattern, the light cycle, the audio signal pattern, and the audio signal cycle.

The memory unit 2105 stores microcode and various reference data of a program for the processing and the controlling of the controller 2107. According to an embodiment of the present disclosure, the memory unit 2105 stores a program and various information for managing the controlled device.

The control unit 2107 controls overall operation of the electronic device. For example, the control unit 2107 processes and controls the voice communication and the data communication. In addition to the typical function, according to an embodiment of the present disclosure, the control unit 2107 can control to form the group with at least one controlling device or at least one controlled device. The control unit 2107 can control to recognize the movement of the at least one other controlling device or controlled device and to re-organize the group. The control unit 2107 can measure the time for keeping the certain distance between the at least one wearable device and the electronic device, and determine that the electronic device is moving when the time exceeds the preset time.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for operating an electronic device, the method comprising:
   transmitting, to a plurality of other electronic devices, a first request signal for establishing communication connections between the electronic device and the other electronic devices;
   receiving, from the plurality of other electronic devices, response signals through the communication connections;
   displaying items corresponding to the plurality of other electronic devices based on the received response signal;
   displaying areas corresponding to roles;
   transmitting, to at least one of the plurality of other electronic devices corresponding to the items for which a first input is detected, a second request signal for outputting an identifiable signal which is visible or audible;
   mapping the roles to at least one device of the at least one of the plurality of other electronic devices based on predetermined rules; and
   transmitting, to the at least one device of the at least one of the plurality of other electronic devices corresponding to the items for which a second input is detected, a third request signal to perform the roles corresponding to the areas.

2. The method of claim 1, wherein mapping the roles to the other electronic devices based on the predetermined rules comprises:
   receiving location information for one of the at least one other electronic device from another device; and
   assigning, by the electronic device, the roles to the one of the at least one other electronic device based on the location information.

3. The method of claim 1, wherein mapping the roles to the other electronic devices based on the predetermined rules comprises:
   assigning the roles to the one of the other electronic devices based on the areas that the items are located in, wherein the items are located in the areas based on drag-and-drop input by a user.

4. The method of claim 3, further comprising:
   if detecting the input for one of the items displayed in one of the areas, displaying an interface for controlling one of the other electronic devices; and
   if detecting another input for the interface for controlling one of the other electronic devices is detected, controlling one of the other electronic devices to perform a function corresponding to the interface.

5. The method of claim 1 further comprising:
   receiving a signal for recognizing the other electronic devices; and
   transmitting a data signal to the other electronic devices.

6. The method of claim 1,
wherein the identifiable signal is defined as at least one of a number, a character, an image, a light color, a light pattern, and a light cycle.

7. The method of claim 1, wherein mapping the roles to the other electronic devices based on predetermined rules comprises:
receiving an identifiable signal from other electronic devices;
determining a location of one of the other electronic devices based on the identifiable signal; and
assigning the roles to the one of the other electronic devices based on the location of the one of the other electronic devices.

8. The method of claim 1, further comprising:
receiving user information from a wearable device;
measuring a time for keeping that a distance between the wearable device and the electronic device is within a certain range;
if the measured time exceeds a preset time, determining that the electronic device moves; and
performing a role of the electronic device based on the user information and information regarding the other electronic devices.

9. An apparatus of an electronic device, the apparatus comprising:
at least one transceiver;
a display unit;
at least one processor configured to:
transmit, to a plurality of other electronic devices, a first request signal for establishing communication connections between the electronic device and the other electronic devices;
receive, from the plurality of other electronic devices, response signals through the communication connections;
display items corresponding to the plurality of other electronic devices based on the received response signal;
display areas corresponding to roles,
transmit, to at least one of the plurality of other electronic devices corresponding to the items for which a first input is detected, a second request signal for outputting an identifiable signal which is visible or audible;
map the roles to at least one device of the at least one of the plurality of other electronic devices based on predetermined rules; and
transmit, to the at least one device of the at least one of the plurality of other electronic devices corresponding to the items for which a second input is detected, a third request signal for requesting to perform the roles corresponding to the areas.

10. The apparatus of claim 9, wherein the at least one processor is further configured to:
transmit, to each of the other electronic devices, a message for requesting to output an identifiable signal;
receive location information for one of the at least one other electronic devices from another device, and
assign, by the electronic device, the roles to the one of the at least one other electronic devices based on the location information.

11. The apparatus of claim 10, wherein the identifiable signal is defined as at least one of a number, a character, an image, a light color, a light pattern, a light cycle, an audio signal pattern, and an audio signal cycle.

12. The apparatus of claim 11, wherein the at least one processor is further configured to:
recognize the identifiable signal, which is transmitted from one of the other electronic devices;
identify a location of one of the other electronic devices based on the recognized identifiable signal; and
assign the roles to the one of the other electronic devices based on the location of the one of the other electronic devices.

13. The apparatus of claim 9, wherein the at least one processor is further configured to:
measure a distance between the electronic device and each of the other electronic devices; and
determine a group with the other electronic devices based on the measured distance.

14. The apparatus of claim 13, wherein the at least one processor is further configured to:
receive user information from a wearable device;
measure a time for keeping that a distance between the wearable device and the electronic device is within a certain range;
if the measured time exceeds a preset time, determine that the electronic device moves; and
perform a role of the electronic device based on the user information and information regarding the other electronic devices.

15. The apparatus of claim 9, wherein the at least one processor is further configured to:
receive a signal for recognizing the other electronic devices; and
transmit a data signal to the other electronic devices.

16. The apparatus of claim 9, wherein the at least one processor is further configured to:
if one of the items is displayed in one of the areas according to a command, assign the roles to one of the other electronic devices corresponding to one of the items; and
if the input for one of the items displayed in one of the areas is detected, control one of the other electronic devices to perform the roles.

17. The apparatus of claim 16, wherein the at least one processor is further configured to:
if the input for one of the items displayed in one of the areas is detected, display an interface for controlling one of the other electronic devices; and
if another input for the interface for controlling one of the other electronic devices is detected, control one of the other electronic devices to perform a function corresponding to the interface.

18. An apparatus of an electronic device, the apparatus comprising;
at least one transceiver;
at least one processor configured to receive, from another electronic device,
a first request signal for establishing communication connections between the electronic device and the another electronic device,
transmit, to the another electronic device, response signals through the communication connections,
receive, from the another electronic device, a second request signal for outputting an identifiable signal which is visible or audible,
output the identifiable signal in response to the second request signal, receive, from the other electronic device, a third request signal to perform roles determined from the another electronic, and perform the roles of the electronic device.

\* \* \* \* \*